US012749071B1

(12) United States Patent
Krishnaswamy et al.

(10) Patent No.: US 12,749,071 B1
(45) Date of Patent: Sep. 29, 2026

(54) PHONE WITH INTEGRATED COLD WALLET MICROCHIP

(71) Applicant: UIPCO, LLC, San Antonio, TX (US)

(72) Inventors: Pooja Krishnaswamy, Cedar Park, TX (US); Gideon Bowie Luck, Plano, TX (US); Ahmad Ali Shaik, Austin, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/897,905

(22) Filed: Sep. 26, 2024

Related U.S. Application Data

(60) Provisional application No. 63/586,627, filed on Sep. 29, 2023.

(51) Int. Cl.
*G06Q 20/36* (2012.01)
*H04W 12/72* (2021.01)

(52) U.S. Cl.
CPC ..... *G06Q 20/3674* (2013.01); *G06Q 20/3678* (2013.01); *H04W 12/72* (2021.01)

(58) Field of Classification Search
CPC .......... G06Q 20/3674; G06Q 20/3678; H04W 12/72
See application file for complete search history.

(56) References Cited

U.S. PATENT DOCUMENTS 10,269,009 B1 4/2019 Winklevoss
2006/0196931 A1* 9/2006 Holtmanns ............. H04L 9/083 235/380
2021/0357914 A1* 11/2021 Silvestri ................ H04L 9/0825
2023/0169826 A1* 6/2023 Higgins .............. G07F 17/3244 463/25
2024/0171385 A1* 5/2024 Gagne-Keats ......... G06Q 20/36

FOREIGN PATENT DOCUMENTS

CN 105069613 A * 11/2015 ........... G06Q 20/401
CN 108776895 A * 11/2018 ........... H04L 9/0894
CN 112000957 A * 11/2020 ............. G06F 21/32
CN 112712155 A * 4/2021 ....... G06K 19/07779

(Continued)

OTHER PUBLICATIONS

Notice of Allowance mailed May 2, 2025 for U.S. Appl. No. 18/145,486.

(Continued)

*Primary Examiner* — Duan Zhang

(74) *Attorney, Agent, or Firm* — Plumsea Law Group, LLC

(57) ABSTRACT

A cold wallet microchip includes a cold wallet that holds various cryptocurrencies. A method provides for operation of a smartphone in which the cold wallet microchip has been inserted that allows for interaction with the cold wallet. The cold wallet can be incorporated into a system that includes secure storage, a battery, and communications hardware. Based on authentication signals the cold wallet microchip can power up and connect the secure storage to the rest of the system, thereby only providing secured access to the keys in the cold wallet. After use, the system disconnects the secure storage and the powers down to cold wallet, protecting the private keys.

18 Claims, 12 Drawing Sheets

(56) References Cited

FOREIGN PATENT DOCUMENTS

| | | | | | |
|---|---|---|---|---|---|
| EP | 3407532 | A2 * | 11/2018 | ........... | H04L 9/0894 |
| EP | 3690685 | A1 * | 8/2020 | ............. | G06F 21/32 |
| WO | 2020172134 | A1 | 8/2020 | | |

OTHER PUBLICATIONS

Strategy Orientation Analysis in the Mobile Phone Case Business, Isoherranen, Ville, Modern economy, Jan. 2011, vol. 2 (3), p. 395-402.
Non-Final Office Action mailed Dec. 19, 2024 for U.S. Appl. No. 18/145,486.

* cited by examiner

PHONE WITH INTEGRATED COLD WALLET MICROCHIP

CROSS-REFERENCE TO RELATED APPLICATION

This application claims the benefit of U.S. Provisional Patent Application Ser. No. 63/586,627 filed on Sep. 29, 2023 and titled "Phone with Integrated Cold wallet Microchip", the disclosure of which is incorporated by reference herein in its entirety.

TECHNICAL FIELD

The present disclosure generally relates to a cold wallet microchip, and in particular to a phone with an integrated cold wallet microchip that may be removable or embedded in the phone.

BACKGROUND

A cryptocurrency is a digital currency designed to work as a medium of exchange through a computer network. A cryptocurrency is not reliant on any central authority, such as a government or bank, to uphold or maintain it. Individual coin ownership records may be stored in a digital ledger. Such a digital ledger is a computerized database that uses strong cryptography to secure transaction records, to control the creation of additional coins, and to verify the transfer of coin ownership.

Cryptocurrency does not exist in physical form like paper money. Cryptocurrencies typically use decentralized control as opposed to control by a central bank or governmental entity. When a cryptocurrency is minted or created prior to issuance or issued by a single issuer, it is generally considered centralized. When implemented with decentralized control, each cryptocurrency works through distributed ledger technology, typically a blockchain, that serves as a public digital ledger to manage the flow of cryptocurrency. Thus, a cryptocurrency is a tradable digital asset or digital form of money, built on blockchain technology that only exists online. Cryptocurrencies use encryption to authenticate and protect transactions, hence their name.

A cryptocurrency wallet is a device, physical medium, program or a service which stores the public and/or private keys for cryptocurrency transactions. In addition to this basic function of storing the keys, a cryptocurrency wallet also often offers the capability of encrypting and/or signing information. Signing can for example result in executing a smart contract, a cryptocurrency transaction, identification, or legally signing a document.

A cold wallet, also referred to as a hardware wallet or offline wallet, is a special type of bitcoin wallet that stores the user's private keys in a secure hardware device. Cold wallets have major advantages over standard software wallets. In cold wallets, private keys may often be stored in a protected area of a microcontroller. Thus, private keys stored in cold wallets cannot be transferred out of the device in plaintext. Cold wallets are also immune to computer viruses that steal from software wallets, can be used securely and interactively, and private keys never touch potentially-vulnerable software. While a cold wallet may provide secure access to cryptocurrency keys, there may be security issues in using such a cold wallet because the cold wallet employs interaction with an external device to reach the Internet. Additionally, cold wallets may be easily lost, creating a situation where rebuilding the keys is useful.

There is a need in the art for a system and method that addresses the shortcomings discussed above.

SUMMARY

In one aspect, a cold wallet microchip configured for insertion in a smartphone is disclosed. The cold wallet microchip (or "chip") includes a cold storage memory module, the cold storage memory module storing at least one private key associated with a cryptocurrency account, and a security module, configured to: (a) receive an activation signal from the smartphone after the cold wallet microchip has been inserted into the smartphone; (b) power up the cold wallet microchip; (c) send a request to the smartphone for authentication credentials; (d) receive authentication credentials from the smartphone; (e) validate the authentication credentials from the smartphone; (f) in response to the authentication credentials being valid, form a physical connection between the security module and the cold storage memory module; (g) receive a request for a cryptocurrency transaction associated with the cryptocurrency account from the smartphone; and (h) conduct the cryptocurrency transaction requested by the smartphone using the at least one private key.

In another aspect, a method performed by a smartphone configured to interact with an onboard cold wallet microchip is disclosed. The method includes a first step of sending an activation signal to activate the onboard cold wallet microchip, and a second step of receiving a request for authentication information from the onboard cold wallet microchip. The method also includes a third step of sending the authentication information to the onboard cold wallet microchip to access a cold wallet provided by the cold wallet microchip, and a fourth step of conducting a cryptocurrency transaction using the cold wallet in response to the authentication information being valid, where the cryptocurrency transaction is conducted when the smartphone is in signal range of a cryptocurrency payment device and the onboard cold wallet microchip is activated.

In another aspect, a method of accessing contents of a cold wallet via a smartphone is disclosed. The method includes a first step of inserting a cold wallet microchip card into a Subscriber Identification Module (SIM) slot of the smartphone, and a second step of sending an activation signal to activate the cold wallet microchip. A third step includes receiving a request for authentication information from the cold wallet microchip, and a fourth step includes sending the authentication information to the cold wallet microchip to access a cold wallet provided by the cold wallet microchip. In addition, a fifth step includes conducting a cryptocurrency transaction using the cold wallet in response to the authentication information being valid.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
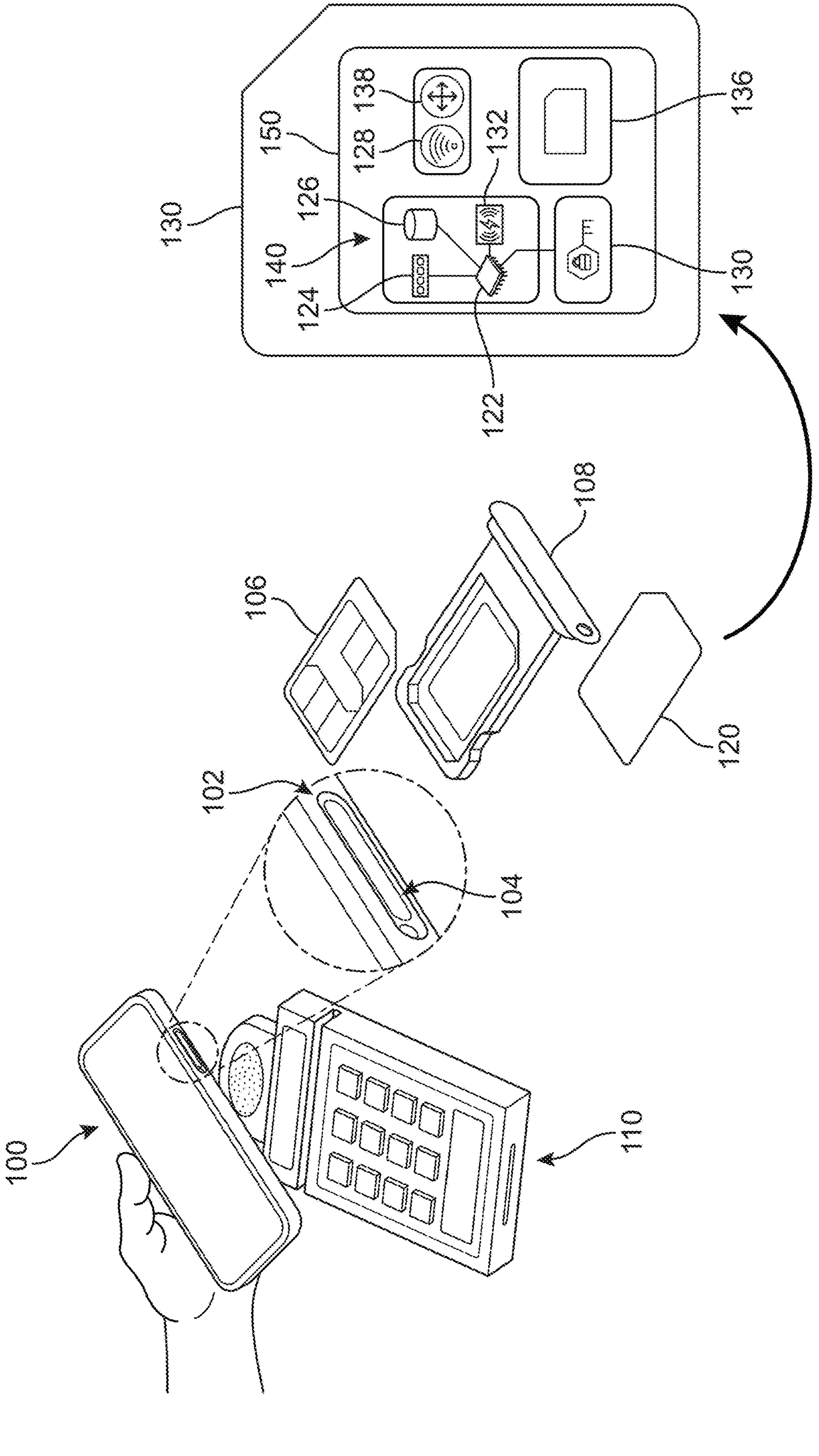
FIG. 1 is a schematic view of a smartphone in which a cold wallet microchip is inserted using a Subscriber Identification Module (SIM) card slot, according to an embodiment.

The embodiments provide a cold wallet provided on a cold wallet microchip (or cold wallet chip) for use in mobile computing devices (also referred to as smart phones, or simply "phones"). The cold wallet can then be physically retained or disposed in the phone itself, as the smart phone will either include an integrated, or a removable, cold wallet chip (CWC). In different embodiments, the CWC itself can be understood to include multiple electronic components, such as a processor, physical connector switch and logic, database, and memory. It can be appreciated that the proposed systems can significantly improve security and privacy, while helping to prevent unauthorized cryptocurrency transactions and related fraud.

As noted above, a cold wallet describes a small database that is generally air gapped or disconnected from the internet or any computer or device. The cold wallet is typically only connected to a device or the internet to facilitate a cryptocurrency transaction. After the transaction is complete, the cold wallet is immediately disconnected from the device. As described herein, an embodiment of the CWC can be provided that runs on its own system on a chip, or system-on-chip (SoC) along with other dedicated discrete semiconductor components, such as but not limited to the Apple® T2 chip or other SoC microchips. As a general matter, an SoC is an integrated circuit that integrates most or all components of a computer or other electronic system. These components can include an on-chip central processing unit (CPU), memory interfaces, input/output devices, input/output interfaces, and secondary storage interfaces, often alongside other components such as radio modems and a graphics processing unit (GPU), all on a single substrate or microchip. SoCs may contain digital, and also analog, mixed-signal, and often radio frequency signal processing functions (otherwise it may be considered on a discrete application processor.

In one example, the CWC can be embedded in the circuit board of the smart phone itself, so that the smart phone is permanently equipped with the cold wallet. In other examples, the CWC can be disposed or provided on a SIM card type form factor that can be inserted into the phone and/or removed from the phone when desired. Generally, whether the CWC is integrated into the phone or configured as a removable device, the cold wallet provided on the CWC includes a database that is disconnected to the smart phone by default and requires some action to physically connect the database to the smart phone. For purposes of reference, when an embodiment of a cold wallet microchip is inserted into the smartphone or otherwise embedded in the smartphone, the cold wallet microchip can be understood to be "onboard" the smartphone.

In different embodiments, the CWC includes features that maintain the security of the contents of the cold wallet which only allow access when required to facilitate a cryptocurrency-based transaction. In some embodiments, the proposed cold wallet can require additional verification beyond a biometric authentication. In some embodiments, the system requires data from an interacting device (a POS terminal, another smart phone, a tablet or other payment device, etc.) where the interacting device informs the smart phone that it is capable of accepting cryptocurrency as a form of payment. In some cases, the system can prevent or grey out the option of using cryptocurrency if this communication is not received from the interacting device. In some embodiments, the system produces a quick response (QR) code or QR animation on a paired smart watch. The smart watch is then shown to the smart phone's front camera as an additional verification to connect the cold wallet to the phone. In another embodiment, a low-power wireless tracker (e.g., Apple® AirTag, Tile®, etc.) is used to provide the additional verification. In another embodiment, an identification code or ID of the wireless tracker can be used as 'half' of a secure key that is combined with the other half of the secure key located on the smart phone itself to create a complete key that is used to provide the additional verification. In different embodiments, these verification techniques may be combined in various combinations. In some embodiments, after the verified cryptocurrency transaction has been completed, the system on the CWC can automatically and immediately disconnect the cold wallet database from the smart phone to prevent unauthorized transactions.

As a general matter, the cold wallet provided by the CWC for integrated into the mobile computing device can include provisions to hold various private keys corresponding to accounts for various cryptocurrencies. These provisions can be incorporated into a discrete system that includes secure storage, a battery and communications hardware. The overall system has robust security features including features that use surface to surface proximity. The CWC can send and receive authentication signals from the smartphone. Based on these authentication signals, the cold wallet may power up and connect the secure storage including a cold wallet to a security module, which would then have access to the private keys of cold wallet for cryptocurrency transactions. After use, the security module of the cold wallet would disconnect the secure storage and power down the cold wallet. The cold wallet stores private keys, and may be able to use the private keys for cryptocurrency transactions such as checking a fund balance, sending cryptocurrency, and receiving cryptocurrency. Some embodiments place restrictions on when the cold wallet may be active and how the cold wallet interacts with a smartphone. Accordingly, it may be possible to avoid some of the security measures that may otherwise be used when using a cold wallet. For example, it may be only possible to access the private keys through the security module. Further, the security module can only interact with the private keys once the cold wallet is active and the smartphone provides credentials. In different embodiments, such credentials may include hardware-based and software-based credentials. For example, these credentials may establish that a user may have access to at least one private key in the cold wallet. Such a private key may be associated with a cryptocurrency account on the blockchain.

For purposes of clarity, an overview of a first embodiment of the proposed systems and methods is illustrated with reference to FIG. 1, and an overview of a second embodiment of the proposed systems and methods is illustrated with reference to FIG. 2. In FIG. 1, a first mobile computing device ("first device") 100 is depicted as it is presented for use during a payment via a cryptocurrency payment gateway device 110, such as Crypto PoS (Point-of-Sale) systems that processes crypto payments and enables the acceptance crypto payments. A magnified view of a side portion 102 that extends around the perimeter of the first device 100 is also provided, which reveals a SIM card slot ("slot") 104. A SIM card tray ("card tray") 108 is shown next to the entry point to the slot 104. In different embodiments, the card tray 108 includes provisions for receiving and holding one or more cards with a SIM-card form factor. In other words, for purposes of this example, the first device 100 includes provisions for dual SIM operations. As a general matter, some mobile phones support use of two SIM cards, described as dual SIM operation. When a second SIM card is installed, the phone may allow users to switch between two separate mobile network services manually, have hardware support for keeping both connections in a "standby" state for automatic switching, or have two transceivers to maintain both network connections at once. In other embodiments, mobile devices with more than two SIM card slots can be used with the proposed systems. It should be understood that while the first device 100 depicted herein includes a removable card tray for insertion of SIM cards, other types of SIM card installation mechanisms can be used, such as a device that has multiple slots provided directly along the back of the device that can be accessed once the outer housing is removed.

In FIG. 1, the card tray 108 can receive a standard SIM card 106, and slid into the phone. However, rather than install another SIM card into their phone using the additional receptacle of the first device 100, users can also or instead insert a first cold wallet chip card ("first card") 120 into the receptacle. Thus, when the card tray 108 is then re-inserted into the slot 104, the first device 100 can be provided with both SIM card 106 as well as first card 120 which has a SIM card form factor, or outer frame 130 sized and dimensioned to be snugly received by a standard SIM card slot. Secured within this outer frame 130 is a first CWC 150.

FIG. 1 further provides a schematic view of a cutaway of internal circuitry embedded in the first CWC 150, according to an embodiment. The first card 120 includes a printed circuit board 140. The printed circuit board 140 includes various electronic components. For example, the circuit board 140 may include, as non-limiting examples, a processor 122, a memory 124, a storage 126, a wireless communication module 128, a security module 130, a wireless power module 132, a battery 134, and a memory card 136.

Processor 122 and memory 124 are each illustrated as being a single unit in FIG. 1. However, processor 122 may include multiple processors or processors with multiple cores. Memory 124 may also take on different forms and may include multiple memory 124 elements. Memory 124 may store information about what credentials may be used for a user to be entitled to access the cold wallet. Storage 126 stores information used by processor 122 and memory 124 in a persistent form. For example, storage 126 may store additional information about what credentials may be used for a user to be entitled to access the cold wallet. Wireless communication module 128 allows the first card 120 to communicate wirelessly with the smartphone once the cold wallet is activated. Security module 130 has two main functions. Security module 130 makes a determination whether a user may be entitled to access all or some of the cryptographic keys used to access cryptocurrency used by the cold wallet. Security module 130 may be designed to then access the keys securely, and to use the keys appropriately when instructed to do so by a user with the correct credentials.

Wireless power module 132 interacts with the smartphone by sending and receiving power with the smartphone to determine when to activate or wake up the case. Battery 134 provides a power source for the case. In general, such a battery 134 will be a rechargeable battery, but it may also be possible to use a non-rechargeable battery that may be replaced when it runs out of energy, or to receive power for the case from the phone itself. Memory card 136 may store information for security module 130. Specifically, memory card 136 may store additional credentials corresponding to a user or users who may wish to access cryptocurrency accounts using private keys. Such credentials may help ensure that credentials based on information stored in memory 124 or storage 126 are fully valid. Memory card 136 stores the private keys themselves. Memory card 136 may only be accessible once the first card 120 is active and once the security module 130 has established an initial connection with the memory card 136. This approach helps secure the private keys.

Thus, while FIG. 1 shows security module 130 as being in direct contact with the memory card 136, such contact may only be permitted when the first card 120 is activated and the user's credentials have been verified. Moreover, the direct contact between security module 130 and the memory card 136 may be managed in this manner to achieve the security and integrity of the private keys. Direct knowledge of the private keys would provide unfettered access to the associated cryptocurrency. Thus, restricting access in this manner protects the security of the private keys. Protecting the private keys thus protects the security of the cryptocurrency accounts associated with the cold wallet itself. However, the cold wallet itself does not have any Internet connectivity. Hence, the cold wallet may communicate with the smartphone as described below. The smartphone may be an intermediary that has internet connectivity and sends data back and forth between the Internet and the cold wallet. The interaction between the smartphone and the cold wallet includes certain safeguards to ensure that the smartphone may be only interacting with the cold wallet in appropriate ways.

As another example, the proposed cold wallet system can alternatively be embedded in the circuitry of the mobile computing device itself. Referring to FIG. 2, an embodiment in which a second CWC 250 is installed in a second mobile computing device ("second device") 200. The second device 200 is depicted in dotted lines to reveal a second cold wallet card ("second card") 210 that is integrated into the electronic components of the second device 200. In this case, the second card 210 includes the second CWC 250 secured to a substrate 230. The second card 210 can then be embedded into the second device 200, for example at the time of manufacture of the second device 200, or during a repair in which the internal components of the second device 200 are accessible. In some embodiments, the second card 210 includes connector elements 220 that can be attached to connecting elements of the second device 200.

Figure 2:
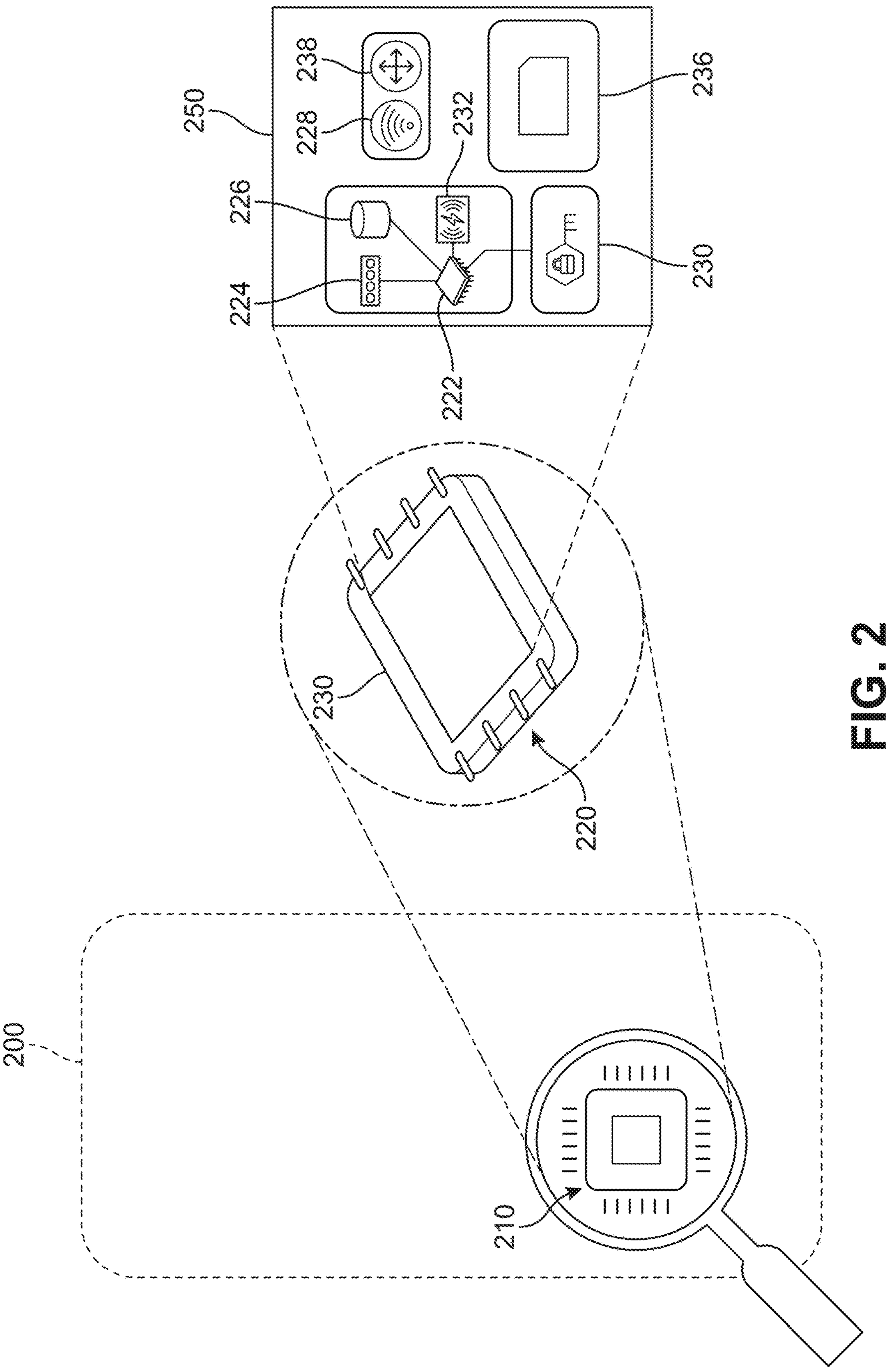
FIG. 2 is a schematic view of a cold wallet microchip that has been embedded into a smartphone, according to another embodiment.

In some embodiments, the second CWC 250 of FIG. 2 can be understood to represent similar features as the first CWC 150 of FIG. 1. As shown in FIG. 2, in different embodiments, the second CWC 250 includes a printed circuit board 240. The printed circuit board 240 includes various electronic components. For example, the circuit board 240 may include, as non-limiting examples, a processor 222, a memory 224, a storage 226, a wireless communication module 228, a security module 230, a wireless power module 232, a battery 234, and a memory card 236.

Processor 222 and memory 224 are each illustrated as being a single unit in FIG. 2. However, processor 222 may include multiple processors or processors with multiple cores. Memory 224 may also take on different forms and may include multiple memory 224 elements. Memory 224 may store information about what credentials may be used for a user to be entitled to access the cold wallet. Storage 226 stores information used by processor 222 and memory 224 in a persistent form. For example, storage 226 may store additional information about what credentials may be used for a user to be entitled to access the cold wallet. Wireless communication module 228 allows the second card 210 to communicate wirelessly with the smartphone once the cold wallet is activated. Security module 230 has two main functions. Security module 230 makes a determination whether a user may be entitled to access all or some of the cryptographic keys used to access cryptocurrency used by the cold wallet. Security module 230 may be designed to then access the keys securely, and to use the keys appropriately when instructed to do so by a user with the correct credentials.

Wireless power module 232 interacts with the smartphone by sending and receiving power with the smartphone to determine when to activate or wake up the case. Battery 234 provides a power source for the case. In general, such a battery 234 will be a rechargeable battery, but it may also be possible to use a non-rechargeable battery that may be replaced when it runs out of energy, or to receive power for the case from the phone itself. Memory card 236 may store information for security module 230. Specifically, memory card 236 may store additional credentials corresponding to a user or users who may wish to access cryptocurrency accounts using private keys. Such credentials may help ensure that credentials based on information stored in memory 224 or storage 226 are fully valid. Memory card 236 stores the private keys themselves. Memory card 236 may only be accessible once the second card 210 is active and once the security module 230 has established an initial connection with the memory card 236. This approach helps secure the private keys.

Thus, while FIG. 2 shows security module 230 as being in direct contact with the memory card 236, such contact may only be permitted when the second card 210 is activated and the user's credentials have been verified. Moreover, the direct contact between security module 230 and the memory card 236 may be managed in this manner to achieve the security and integrity of the private keys. Direct knowledge of the private keys would provide unfettered access to the associated cryptocurrency. Thus, restricting access in this manner protects the security of the private keys. Protecting the private keys thus protects the security of the cryptocurrency accounts associated with the cold wallet itself. However, the cold wallet itself does not have any Internet connectivity. Hence, the cold wallet may communicate with the smartphone as described below. The smartphone may be an intermediary that has internet connectivity and sends data back and forth between the Internet and the cold wallet. The interaction between the smartphone and the cold wallet includes certain safeguards to ensure that the smartphone may be only interacting with the cold wallet in appropriate ways.

With respect to the systems presented in both FIGS. 1 and 2, some embodiments may include provisions for ensuring that keys in the cold wallet may be secure. In some embodiments, the private keys in particular may be secured. In some cases, the private keys may be stored so that they can only be accessed using a security module. In some embodiments, the private keys may be stored in a secure memory card. In some cases, the secure memory card may be preprogrammed and may be fixed within the first card 120 and/or second card 210. In some embodiments, the memory card may be programmable. In some cases, the memory card may be removable. In some embodiments, the memory card may be a microSD card, an SD card, a Compact Flash card, a Memory Stick card, or another type of memory card. In some cases, the memory may be another form of memory, such as a hard drive or another medium.

In some cases, the private keys may only be accessible when the cold wallet is turned on through the mobile computing device. In some embodiments, the private keys may be encrypted, adding another aspect of protection. In some cases, the private keys use access credentials to be used. In some embodiments, such credentials may include biometric credentials. In some cases, biometric credentials may include a fingerprint scan, a retinal scan, facial recognition, and so on. In some cases, such credentials may include a username and password. In some embodiments, such credentials may include a personal identification number (PIN).

In some embodiments, the credentials may include hardware credentials. In some cases, the hardware credentials may include an International Mobile Equipment Identity (IMEI) number identifying the smartphone or information from a Subscriber Identity Module or Subscriber Identification Module (SIM) card or chip embedded in the smartphone (e.g., SIM card 106). Validating such credentials may help confirm that only an authorized user can access cryptocurrency associated with the cold wallet.

In some embodiments, other information derived from the hardware of a smartphone in which the first card 120 and/or second card 210 is installed may be used to establish that the smartphone may be entitled to access the cold wallet. In some cases, information establishing proximity between the smartphone and the cold wallet may be used to provide access to the cold wallet. In some embodiments, the credentials may include two-factor authentication, or even three or more forms of authentication. By using these combinations of credentials, once the cold wallet in the first card 120 and/or second card 210 is powered on, access to the private keys may be restricted.

Figure 3:
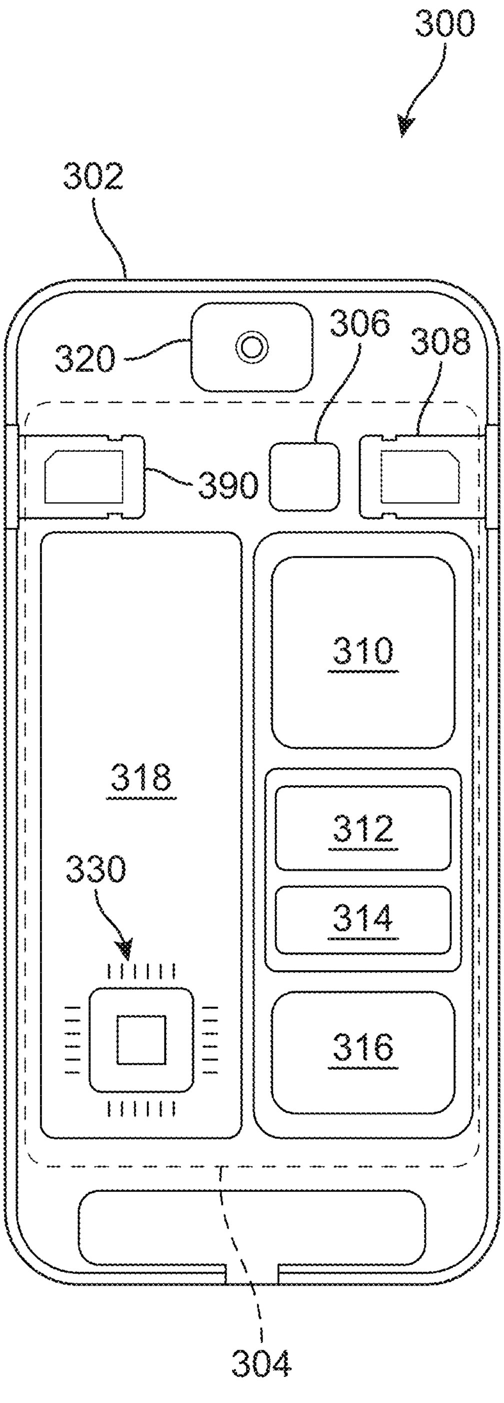
FIG. 3 is a schematic view of a smartphone in which a cold wallet microchip has been disposed, according to an embodiment.

In order to provide additional clarity to the reader, FIG. 3 shows a schematic view 300 of a smartphone, according to an embodiment. In this case, FIG. 3 includes schematic diagram 300 of a smartphone 302 showing components that may be used in the interaction with a cold wallet in an embodiment. For purposes of illustration, the smartphone 302 includes two separate cold wallets: a first cold wallet provided by a third CWC card ("third card") 390 and inserted via one of two SIM card slots (e.g., see FIG. 1), and a fourth CWC card ("fourth card") 330 embedded into the smartphone 302 (e.g., see FIG. 2). Thus, in some embodiments, a mobile computing device can be equipped with more than one cold wallet if so desired by installing multiple CWC cards (each card providing a separate, independently secured cold wallet) as described herein. In this case, the third card 390 has been inserted into the smartphone 302 via a slot that is separate from the slot that is being used for the SIM card itself. In other embodiments, the smartphone 302 can employ any known techniques for dual SIM receptacles.

While smartphone 302 is generally assumed to be a smartphone, other appropriate mobile devices such as a tablet or a tablet may be used instead of a smartphone as smartphone 302 in other embodiments. Smartphone 302 includes a display 304, shown in dotted line to reveal the electronic components arranged behind the display 304. In some embodiments, display 304 may display information about interactions with cryptocurrency accounts provided by the cold wallet to a user of smartphone 302 when interaction with such a cold wallet may be activated and subsequently utilized.

The interaction may also facilitate the provision of credentials and otherwise establish access by a user to the user's crypto currency in a safe manner. Display 304 also acts as a user interface that a user of smartphone 302 may use to perform cryptocurrency transactions once the user has established credential. In some embodiments, smartphone 302 can allow a user to establish that a given user may be allowed to have access to certain cryptocurrency, but not other cryptocurrency. The access may be based on credentials that provide indications that certain users should access specified private keys. Those private keys may then be associated with amounts of various cryptocurrencies. For example, one user may have access to an account with access to some Bitcoin and some Ethereum. Another user may have access to an account with access to some Bitcoin and some Ripple.

In different embodiments, smartphone 302 additionally includes a GPS unit 306. Data obtained from this GPS unit 306 allows smartphone 302 to report its location to confirm that it may be in a suitable location to access cryptocurrency. For example, smartphone 302 may verify the location of the smartphone 302 using the GPS unit 306. The smartphone 302 may be restricted to accessing cryptocurrency at certain locations. Such a restriction may help preserve the security of cryptocurrency, so that transactions can only occur when the smartphone 302 may be in a safe location. Smartphone 302 may also include a subscriber identification module (SIM) 308, as described with respect to FIG. 1. In some embodiments, SIM 308 may serve to authenticate smartphone 302 with the cold wallet(s) as part of the hardware credentials. Using the SIM may be helpful in establishing the legitimacy of a cryptocurrency transaction the smartphone 302 wishes to perform in an interaction with the cold wallet(s).

Smartphone 302 may also include a processing unit 310 that acts as a control module for the components of smartphone 302, including display 304 and camera 320. In some embodiments in which smartphone 302 provides instructions to power on and then interact with the cold wallet(s), processing unit 310 may also direct the cryptocurrency interactions. In other embodiments, processing unit 310 merely acts a control module for a separate cryptocurrency control module present on smartphone 302. In other embodiments, some or all of the cryptocurrency control module may be remote (such as being a part of the cold wallet(s), such as the control module of the CWC chip). In such embodiments, smartphone 302 may display information about the cryptocurrency accounts received from the cryptocurrency control module. Further, in such embodiments, processing unit 310 in smartphone 302 may receive communications from the cryptocurrency control module so that smartphone 302 may be notified of a cryptocurrency account's balance or may have access to information about transactions.

The communication directed by the processing unit 310 may also provide a user interface, shown using display 304, that allows smartphone 302 to initiate cryptocurrency transactions. Such cryptocurrency transactions may include transactions where the cold wallet provides an associated wallet address or public key so that another user may send cryptocurrency for receipt by the cold wallet. Cryptocurrency transactions may also include transactions where the cold wallet receives a wallet address or public key as well as information about how much cryptocurrency of a given type or types to send to a recipient and any necessary transaction fee or fees.

Smartphone 302 may also include a connection module 316. Connection module 316 may be associated with a wired connection to smartphone 302. For example, the wired connection may be used for charging smartphone 302. The wired connection may also be used for making a wired data connection between smartphone 302 and another device. In some embodiments, the initial powering on of the cold wallet(s) may occur by use of a power module or a battery 318, power that can be transferred via connection module 316. However, connection module 316 may serve to send authentication (both hardware and software) information to the cold wallet. In some embodiments, connection module 316 also serves as a communications path for updating firmware or uploading security data into a security module installed on smartphone 302.

Smartphone 302 further includes a memory 314. In some embodiments, memory 314 stores information about accessing cryptocurrency accounts accessible through the cold wallet. In some embodiments, memory 314 may also serve as local storage for information used for a user interface. For example, memory 314 may store software for managing cryptocurrency associated with smartphone 302, providing a user interface for the user of the smartphone 302 to manage the user's cryptocurrency portfolio.

Smartphone 302 may also include a communication module 312. Communication module 312 may be associated with wireless communications (such as Wi-Fi, Bluetooth, Near-Field Communication (NFC) technologies, and cellular communications of various types for transmissions over the Internet). Such interactions may occur with other devices, servers, and databases proximate to the smartphone 302. In some embodiments, communication module 312 thus allows smartphone 302 to wirelessly send and receive information about cryptocurrency transactions to and from the security module of the cold wallet.

Communication module 312 may send and receive information to and from the cold wallet, providing software and hardware authentication information. Communication module 312 may also provide the smartphone 302 with a connection to the Internet. The smartphone 302 can relay information to and from the Internet, which may be necessary for the cold wallet to be able to interact with the blockchain. Without such access, the cold wallet cannot perform any transactions. Simply having the private keys in cold storage may not be sufficient to perform transactions.

Instead, the private keys may interact with the blockchain to determine a cryptocurrency balance or to introduce a transaction into the blockchain.

Smartphone 302 also includes battery 318 which can power the CWC chip(s) when the CWC chip(s) is powered on, and a camera 320. Battery 318 may provide a power source for smartphone 302. In some embodiments, camera 320 takes images of the user to be analyzed using facial recognition or other biometric information as a credential to help ensure that only a legitimate user may be able to access a cryptocurrency wallet associated with private keys stored in the cold wallet(s).

Figure 4:
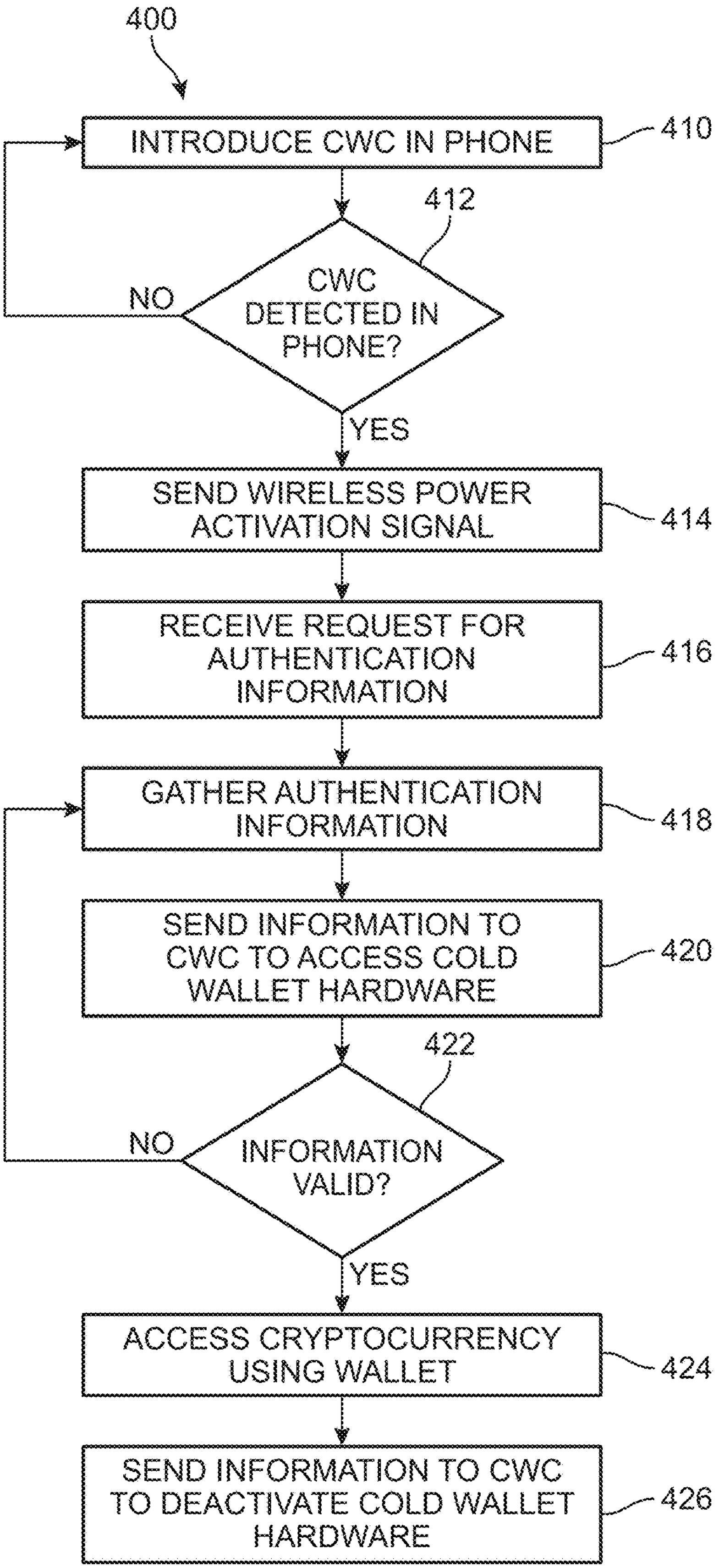
FIG. 4 is a flowchart of an operation process for a cold wallet, according to an embodiment.

FIG. 4 is a flowchart 400 of an operation process for a cold wallet, according to an embodiment. FIG. 4 is presented from the perspective of how the operation process works from the perspective of the smartphone. In step 410, a user introduces a CWC into a smartphone. In step 412, the CWC establishes whether there may be a smartphone detected in its proximity. If not, the method returns to step 410 and the CWC waits for installation in a smartphone. If the smartphone is detected, the method proceeds to step 414, in which the smartphone sends a wired or wireless power activation signal to the CWC.

For example, such a power activation signal may be sent by a wireless charging component of the smartphone and may be received by a wireless power module of the CWC. The power activation signal may include a specific signal that may be preset for a given CWC that causes the CWC to power up. Once the CWC has powered up, in step 416, the smartphone receives a request from the CWC for authentication information. While the specifics of the authentication information may vary, the authentication information generally includes both hardware and software credentials establishing the legitimacy of the smartphone. The credentials establish that the user of the smartphone may be entitled to access the cold wallet and may not be abusing the cryptocurrency accounts as a malicious actor. For example, the credentials may confirm the identity of the smartphone and the identity of the user. The credentials may also confirm that an application or app run by the smartphone is sharing correct information with a user and is not providing different information to the user from that provided to the CWC. If the smartphone did so, an infected application could authorize a transaction differing from the user's intent.

In step 418, the smartphone gathers authentication information. As discussed further below, such authentication information may include hardware credentials associated with the particular smartphone being used. The authentication information may also include software credentials associated with an operating system or an application used by a user to potentially conduct cryptocurrency transactions using the cold wallet. In step 420, the smartphone sends the authentication to the CWC to use cold wallet hardware. In step 422, the CWC determines if the information is valid. If no, the method returns to step 418 to gather authentication information again for another attempt to access cold wallet hardware. If yes, the method proceeds to step 424.

Figure 6:
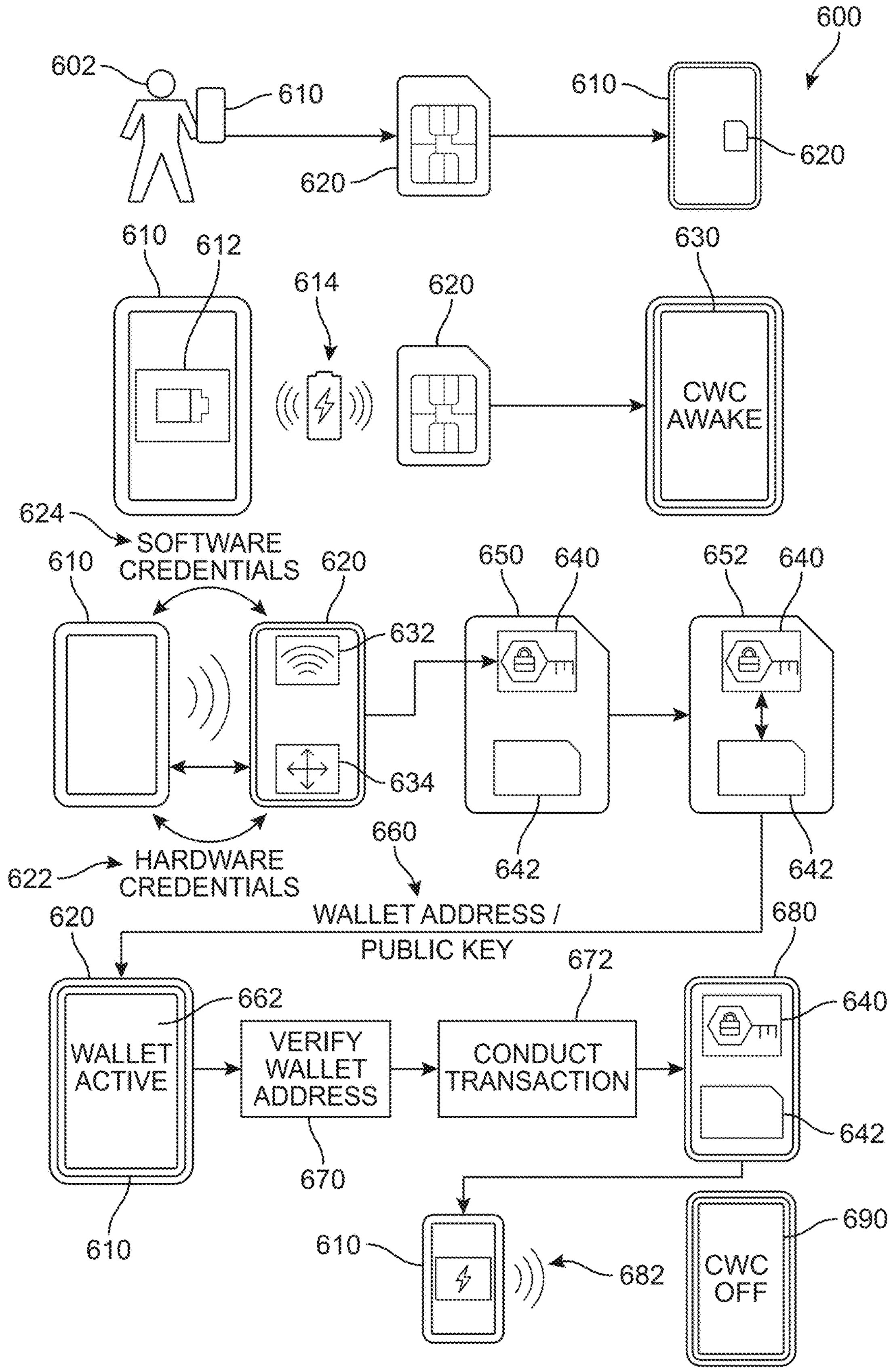
FIG. 6 is an example of a user interacting with the cold wallet, according to an embodiment.
Figure 7:
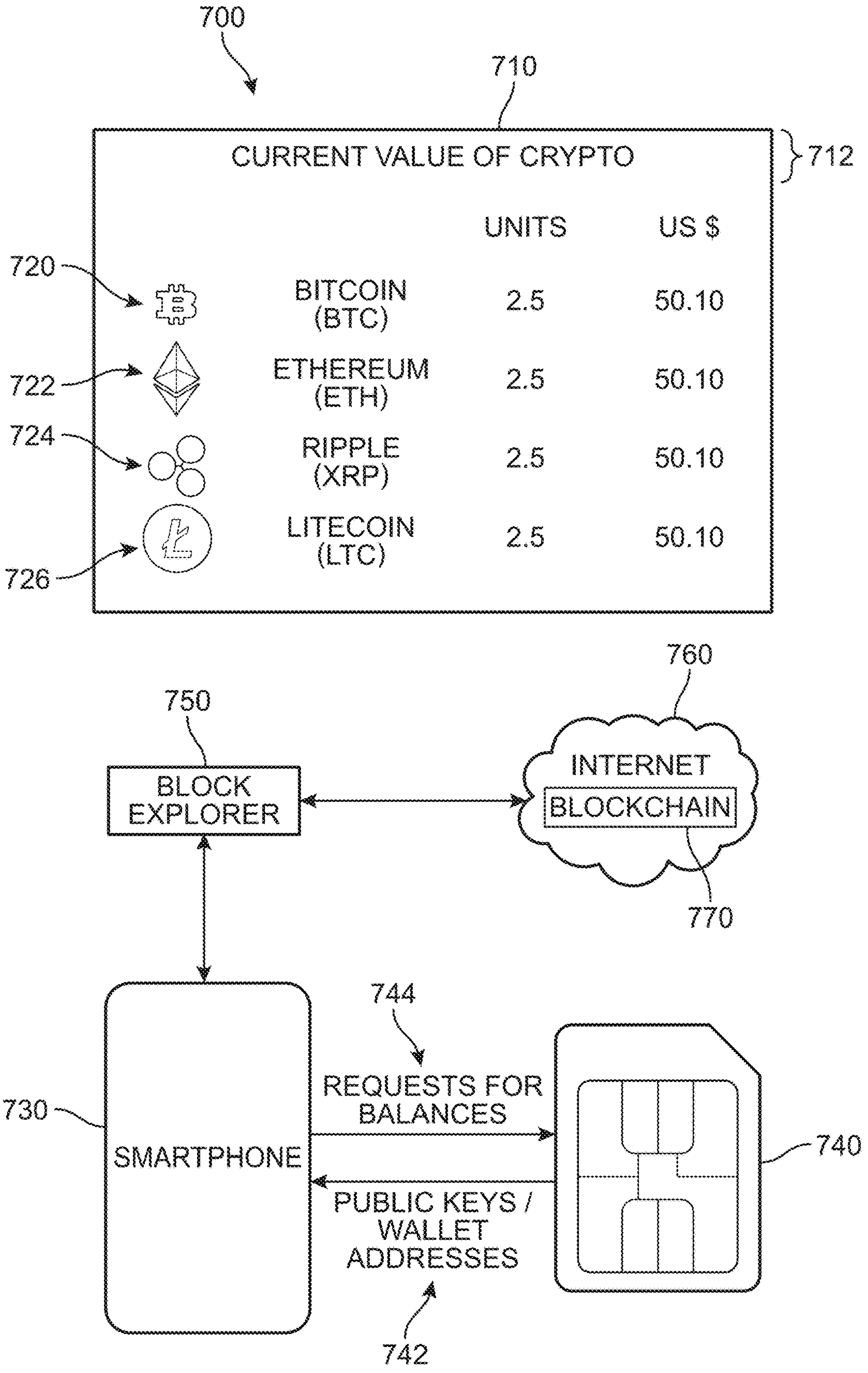
FIG. 7 is an example of using the cold wallet to perform a balance check, according to an embodiment.
Figure 8:
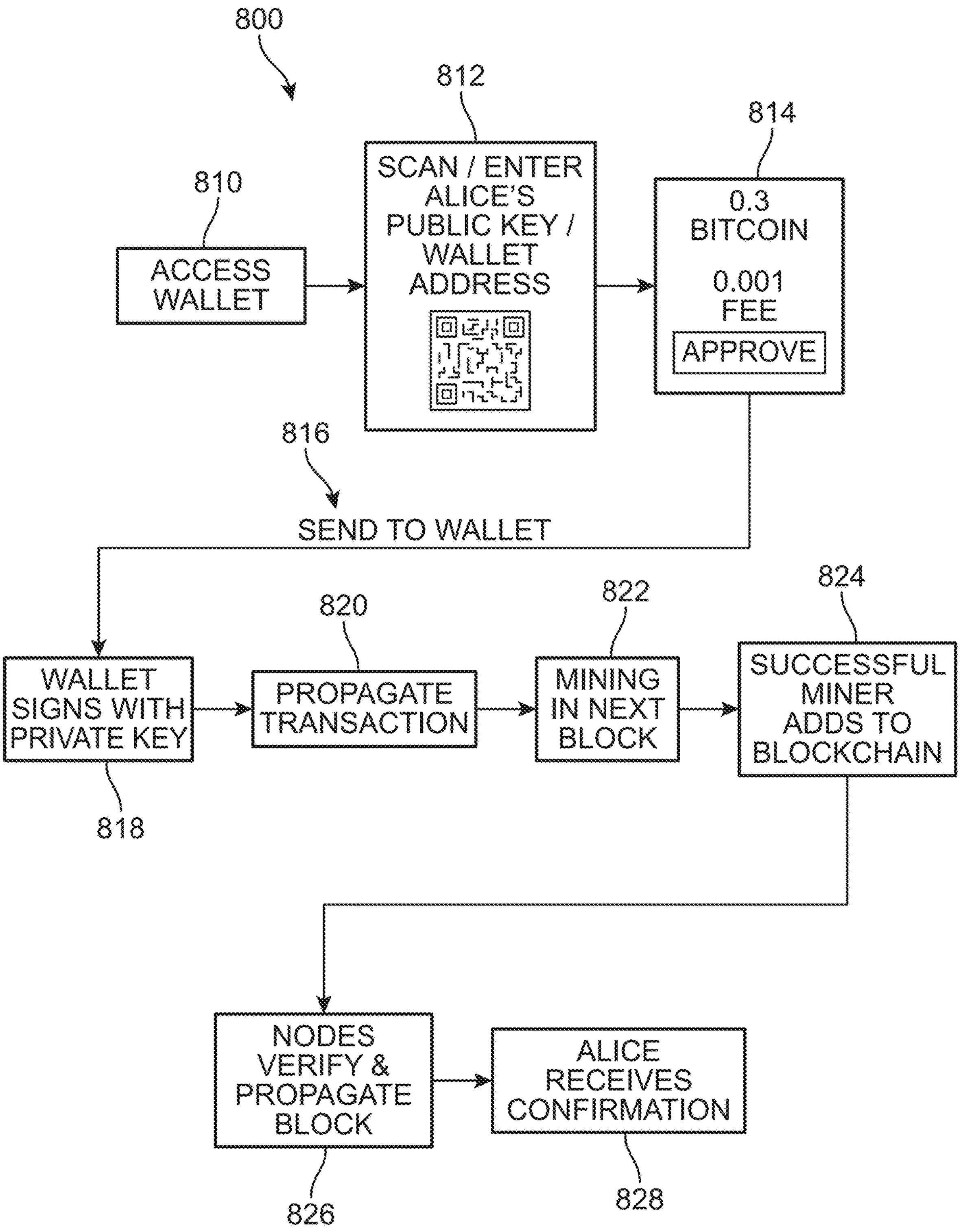
FIG. 8 is an example of steps involved in a cryptocurrency transaction, according to an embodiment.

In step 424, the method allows the authenticated user (who may be an owner of the smartphone contained in the case or another authorized user) to access cryptocurrency using the cold wallet. This access may take the form of a balance check, as shown in FIG. 7. Alternatively, the access may take the form of receiving funds as shown in FIG. 13, or sending funds, as shown in FIGS. 6 and 8. Once the user of the smartphone may be done accessing his or her cryptocurrency using a wallet in step 424 (any number of accesses may occur, until the user of the smartphone may be done accessing cryptocurrency), step 426 may conclude the method.

Specifically, in step 426, the smartphone sends information to the CWC to deactivate the cold wallet hardware. In one example, such information may be sent using the sent by the charging component of the smartphone and may be received by the power module of the CWC. Such deactivation involves decoupling the secure storage with the security module and powering down the cold wallet hardware. Thus, subsequent to step 426, the cold wallet hardware will be inert, unusable, and inaccessible until the CWC may be activated again, for example using a wireless power activation signal and then the cold wallet is made accessible with the appropriate credentials. Accordingly, while the private keys associated with cryptocurrency will remain safe, the keys will be protected from malicious access because they may be stored in a secure storage that may be air-gapped until it may be ready for authorized access.

Figure 5:
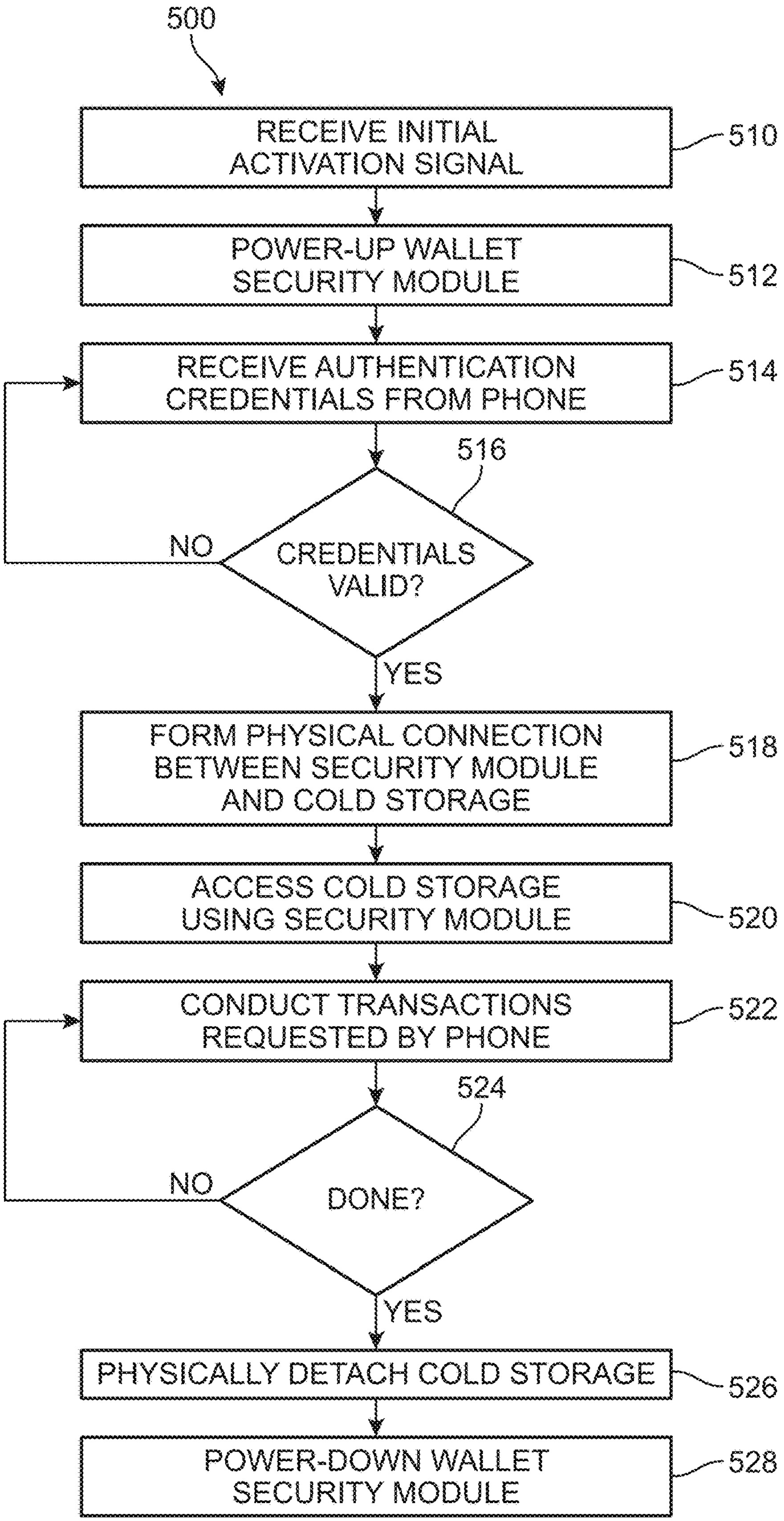
FIG. 5 is another flowchart of an operation process for a cold wallet, according to an embodiment.

FIG. 5 is another flowchart 500 of an operation process for a cold wallet, according to an embodiment. FIG. 5 is presented from the perspective of how the operation process works from the perspective of the CWC. In step 510, the process receives an initial activation signal. This step 510 is the counterpart of step 414 of FIG. 4, and the initial activation signal may be from the smartphone to the CWC using data embedded in a wireless power signal. In step 512, the CWC, in response to receiving the initial activation signal, powers-up the cold wallet security module.

After powering-up, the cold wallet security module may be made ready for step 514, in which the cold wallet security module receives authentication credentials from the smartphone. Such authentication credentials may include hardware credentials and software credentials, as discussed further in FIG. 6. In step 516, the CWC may determine if the authentication credentials are valid. If not, the method returns to step 514 to receive a new set of authentication credentials from the phone. It may be of value to validate credentials prior to initiating access to the cold storage. Such validation protects the key data stored in the cold storage. The private key data may only be used as appropriate to sign a transaction. The required credentials ensure that the private keys may never be misused. If the credentials may be determined to be valid in step 516, the method proceeds to step 518.

In step 518, the CWC forms a physical connection between the security module and the cold storage (also referred to herein as "coupling"). Such a physical connection may only be present when the cold storage and the private keys it contains may be about to be actively used. Once the CWC forms the physical connection, in step 520, the CWC accesses the cold storage using the security module. Thus, the security module receives requests for various types of information and transactions based on the private keys stored in the cold storage. For example, the private keys stored in the cold storage may be used by the security module in three main ways. First, the private keys may be transformed to provide a wallet address or a public key that may be then used to ascertain a balance of one or more types of cryptocurrency associated with the wallet address or the public key. Second, the private keys may be transformed to provide a wallet address or a public key that can then be provided to a sending entity as a destination for cryptocurrency.

The private keys may be used to derive the public key. For example, the public keys may be derived using a one-way cryptographic technique, such as elliptic curve multiplication. The public keys may be further processed using a one-way hashing function to yield a wallet address, such as a Bitcoin address. Generally, to allow another party to send Bitcoin or another cryptocurrency, the receiving party provides the corresponding wallet address. For example, the wallet address may be provided as an alphanumeric string that usually consists of around 25 to 40 alphanumeric characters, which may include numbers, letters (which may be uppercase and/or lowercase) and sometimes special symbols. Alternatively, the public key or wallet address may be presented as a Quick Response (QR) code that may be scanned using a camera or another appropriate scanner that may be able to extract the information included in the QR code.

Third, the private keys may themselves be used to sign a transaction sending funds to another party. Usually, in a wallet (such as a cold wallet), the private keys may be associated with a secret phrase, which may be a collection of 5-24 words (in a human language, such as English) that store the information used to recover and access the funds of a wallet. These words may be sufficient to derive the private key, and hence having access to the secret phrase may be tantamount to having access to the private key. Because the private keys may be stored in cold storage in the CWC, there may be no expectation to store the secret phrase in the CWC, though it may be possible to do so to provide a backup of the private keys. Instead, it may be desirable to store the secret phrase at a secure, separate location.

Thus, in step 522, the CWC conducts transactions as requested by the phone. After each transaction (which may be a balance check, sending cryptocurrency, or receiving cryptocurrency), the CWC performs step 524, which may be a check to see if the smartphone may be done with cryptocurrency transactions. For example, step 524 may involve the CWC receiving a command from the smartphone. Such a command to stop transactions may be initiated by a user using an interface of the smartphone or may be automatically generated after a certain transaction. Alternatively, in step 524, the CWC may decide that there may be no further transactions after a certain number of transactions, which may be one transactions or two or more transactions.

The CWC may also shut down after a certain amount of time elapses, or if the CWC receives a command spoken by the user. The CWC will also determine that the CWC may be done with transactions when the CWC may be physically removed from the smartphone. If step 524 determines that the phone may not be done with transactions, the method returns to step 522 to allow more transactions. If step 524 determines that the phone may be done with the transactions, in step 526, the CWC physically detaches the cold storage from the security module (also referred to herein as "decoupling"). Subsequently, in step 528, the CWC powers-down the cold wallet security module. After step 528, the method may begin again at step 510 when the CWC may be to provide access to the cold wallet.

FIG. 6 is an example 600 of a user interacting with the cold wallet, according to an embodiment. In FIG. 6, a user 602 holds a smartphone 610. While FIG. 6 shows the use of a smartphone 610, it may be recognized that other devices such may be adapted for use in other embodiments. As shown in FIG. 6, the user inserts a CWC 620 into smartphone 610 in the case of a removable CWC; otherwise the smartphone may already include a CWC and so the insertion step is skipped. In some embodiments, smartphone 610 includes a wireless power module 612, which can send a wireless power signal 614 to CWC 620, where the wireless power signal 614 may be received by a wireless power module 622 of the CWC 620.

In some embodiments, the receipt of the wireless power signal 614 causes a display 630 of the smartphone 610 to display a message such as "CWC AWAKE." Such a message indicates that the CWC 620 may be ready to exchange credentials with the smartphone 610 to initial cryptocurrency transactions. Thus, the smartphone 610 provides credentials for reception by the CWC 620. Such credentials may include hardware credentials 622, software credentials 624, or a combination of both of these types of credentials.

For example, hardware credentials 622 might include data provided by a SIM card, or an IMEI number of the smartphone 610. These hardware credentials 622 may be a part of a proof that a user may be using a smartphone 610. The software credentials 624 might include a combination of information from a mobile app or an operating system as provided by the smartphone 610. For example, such information might include a variety of information identifying a user or a user account to access using the CWC. The hardware credentials 622 and software credentials 624 establish which keys the user may be able to access for cryptocurrency transactions. The hardware credentials 622 and software credentials 624 may be received by a wireless transmission or a wired transmission of information from the smartphone 610 to CWC 620.

For example, wireless communications module 632 may allow communication based on a protocol such as Bluetooth, Wi-Fi, cellular (3G, 4G LTE, 5G NR, etc.), ZigBee, Near-Field Communication (NFC), and so on. As an alternative, wireless power module 622 of the CWC 620 may also provide the capability to exchange credential information, rather than solely using a signal associated with wireless power to turn the CWC 620 on. As another alternative, the smartphone 610 may send hardware credentials 622 and software credentials 624 using a physical connection between the smartphone 610 and the CWC 620. For example, there may be a physical connection between the smartphone 610 and the CWC 620, such as through the circuit board of the smartphone 610 and a connector element of the CWC 620. The physical data exchange may be managed by a communication module 634 in some embodiments.

Diagram 650 shows two of the components of the CWC 620. Specifically, diagram 650 includes security module 640 and cold storage 642. Once security module 640 receives the appropriate hardware credentials 622 and software credentials 624, diagram 652 shows that security module 640 may be physically connected to cold storage 642. For example, such a physical connection may involve using an electronically controlled switch that allows security module 640 to interact with cold storage 642 only when authorized. The switch may turn on and forms the physical connection only for a limited time when the security module 640 may be actively authorized to access the private keys stored in cold storage 642.

Once the security module 640 accesses the cold storage 642, it then uses the private key or keys stored in the cold storage 642 to derive a wallet address and/or public key 660 to be sent to the smartphone 610. At this point, the smartphone 610 may display a message 662 that indicates that the cold wallet may be active. A step 670 occurs in which the security module 642 verifies a wallet address. Step 672 involves conducting a transaction. The nature of steps 670 and 672 vary depending on the nature of the transaction. In different embodiments, the transaction may be a balance check, a receipt of cryptocurrency, or a transmission of cryptocurrency.

Based on the transaction type, step 670 may take advantage of the secure information interchange between the smartphone 610 and the CWC 620 to ensure that the correct wallet address may be being used. Steps 670 and 672 may also use the secure information interchange between the smartphone 610 and the CWC 620 to ensure that the correct parameters of the transaction may be used to conduct the transaction. While step 672 refers to conducting a single transaction, step 672 may be performed multiple times and multiple transactions may be performed.

Once the transaction or transactions are complete, diagram 680 applies. Diagram 680 shows that security module 640 and the cold storage 642 are not physically connected any more (are physically disconnected). Thus, the private keys stored in cold storage 642 may no longer be accessible. In some embodiments, to conclude the process shown in FIG. 6, the smartphone 610 can send a wired or wireless power signal 682 to CWC 620. Diagram 690 shows that smartphone 610 displays "CWC OFF." Alternately the user 602 may physically remove the CWC 620 from the smartphone 610. This action will also cause the smartphone 610 to display "CWC OFF."

Some embodiments may include provisions for accessing keys associated with the cold wallet. In some embodiments, the cold wallet may be accessed using a wallet address. Such a wallet address may be used when attempting to ascertain a balance associated with the cold wallet or when providing a destination so that additional parties can send cryptocurrency to the cold wallet. In some embodiments, the wallet address may be a hashed string derived from at least one private key. In some cases, the wallet address may be provided as a QR code derived from at least one private key. In some embodiments, the cold wallet uses actual keys. In some cases, the cold wallet uses public keys and private keys. The public keys may be derived using cryptographic techniques from the private keys.

In some cases, the cold wallet uses private keys for transactions. Such private keys may be stored in cold storage when not used. In some embodiments, there may be a single private key, and only a single-signature may be necessary. In some cases, the cold wallet may be a multiple-signature (multi-sig) wallet. In a multi-sig wallet, multiple private keys may be used to sign a transaction. In some embodiments, all of the private keys associated with the cold wallet may be used to sign a transaction. In some cases, a subset of the private keys associated with the cold wallet may be sufficient.

Some embodiments may include provisions for obtaining access to the cold wallet to perform various cryptocurrency transactions. In some embodiments, the cold wallet may be accessible to use the information stored inside to conduct transactions. That is, access occurs only after the CWC has been activated. In some cases, the cold wallet uses additional credentials to become accessible for conducting transactions, as discussed above. In some embodiment, the access to the cold wallet, once activated, includes a request for a wallet balance. In some cases, such a balance may correspond to a single cryptocurrency account consisting of a single type of cryptocurrency. In some cases, the balance may correspond to multiple accounts, which may correspond to multiple types of cryptocurrency.

In some embodiments, requesting the cold wallet balance involves using a block explorer. In some cases, the cold wallet provides a public key to the block explorer. Such a public key may be obtained from private keys at the cold wallet using a cryptographically secure, one-way technique such as elliptic curve multiplication. In some embodiments, the cold wallet provides a wallet address to the block explorer. Such a wallet address may be further obtained by performing a hashing operation on the public key. Whether a public key or a wallet address may be provided to the block explorer, the public key or wallet address identifies the cryptocurrency account or accounts on the blockchain that may be associated with the user.

In some cases, the block explorer traverses the blockchain using the public key or wallet address, compiling cryptocurrency balances associated with the account. In some embodiments, block explorer traverses the blockchain using the public key or wallet address and gathers information about an overall history of transactions associated with the corresponding account. In some cases, the block explorer traverses the blockchain and gathers detailed information about a specific transaction or specific transactions. In some embodiments, rather than using a block explorer, requesting the balance involves tracking cryptocurrency tractions locally at the CWC.

In some embodiments, the cold wallet provides the ability to receive funds using the cold wallet. In some cases, the cold wallet may be able to receive funds by providing account information to a sending party. In some cases, the cold wallet electronically shares account information with a sending party to allow the sending party to send cryptocurrency. In some cases, the cold wallet sends a public key to the sending party. In some embodiments, the cold wallet sends a wallet address derived by hashing instead of sending the actual public key.

In some cases, the wallet address may be provided as a Quick Response (QR) code or a hashed string in a variety of ways. In some embodiments, the public key or wallet address may be provided to a sending party manually. A smartphone may show the string or cut and paste the string to the sending party. The smartphone could also use a secure messaging protocol to provide the string. The smartphone could also show a QR code to a sending party, which will allow the sending party to determine how to send cryptocurrency to the smartphone. In some cases, the secure trust relationship between the smartphone and the CWC allows the CWC to be confident that the smartphone will not compromise the account information when sharing the account information with the sending party.

In some embodiments, the cold wallet sends funds to a destination account. In some cases, the cold wallet sends funds using a public key associated with a receiver of the funds. In some embodiments, the cold wallet sends funds using a wallet address associated with a receiver of the funds. In some cases, the wallet address may be obtained by taking a picture of a QR code corresponding to the receiver of the funds. In some embodiments, the cold wallet may be selected as a destination by entering a wallet address as an alphanumeric string.

FIG. 7 is an example 700 of using the cold wallet to perform a balance check, according to an embodiment. For example, a display 710 of a smartphone 730 may share information about cryptocurrency associated with a cold wallet provided by a CWC 740. For example, the smartphone 730 may make a request for balances 744, such as in response to a request made by a user of the smartphone 730, once the smartphone 730 is properly authenticated. In response, the CWC 740 sends public keys or wallet addresses 742 associated with the cryptocurrency wallet.

The public keys or wallet addresses 742 allow the device 730 to track transactions associated with the cold wallet on the blockchain, which establishes balances of various types of cryptocurrency associated with the cold wallet. Specifically, the smartphone 730 sends the public keys 742 to a block explorer 750. A block explorer 750 is an online tool that enables a user to search for real-time and historical information about a blockchain, including data related to blocks, transactions, addresses, and more. Thus, block explorer 750 traverses the blockchain 770, which may be distributed across the Internet 760. The display 710 of smartphone 730 shows multiple pieces of information about balances of cryptocurrency of various types associated with the cold wallet. For example, header 712 indicates that the display 710 is showing the current amount and value of various cryptocurrencies.

For example, the display 710 shows icons, names, and symbols identifying various types of cryptocurrency. The display 710 also shows a quantity of units of each cryptocurrency, as well as a current value of the cryptocurrency of that type in U.S. Dollars. However, it may also be possible that the value of cryptocurrencies could be displayed in another standard currency issued by a government (Euros, Japanese Yen, Chinese Yuan, etc.). The display 710 shows information about sample types of cryptocurrency associated with the cold wallet including an amount of Bitcoin 720, an amount of Ethereum 722, an amount of Ripple 724, and an amount of Litecoin 726.

However, these are only examples of cryptocurrency, and other altcoins maintained on a blockchain 770 may also be tracked by using public keys to access the blockchain 770 using a block explorer 750. Part of the nature of cryptocurrency is that the blockchain 770 is redundant and publicly available. Thus, using public keys or wallet addresses 742 allows a determination of balances of cryptocurrency without jeopardizing the underlying security of the accounts in that no actual transfer or reassignment of cryptocurrency in an account can occur without access to private keys. As discussed above, private keys may be protected in the cold wallet using a number of security measures, which may include proximity and other authentications such as usernames, passwords, PINs, biometric identifiers, and so on.

FIG. 8 is an example 800 of steps involved in a cryptocurrency transaction, according to an embodiment. In the cryptocurrency transaction, a user desires to send cryptocurrency to another user of the blockchain, who may be named Alice, as an example. In step 810, a user of the smartphone accesses the cold wallet so the smartphone will cause the cold wallet's security module to have access to the private keys used to sign the cryptocurrency transaction to transfer cryptocurrency to Alice. In step 812, the smartphone acquires Alice's public key or wallet address. For example, step 812 shows that Alice provides a Quick Response (QR) code that may be captured by a camera of the smartphone and decoded to yield Alice's wallet address. However, Alice may provide the public key or wallet address using other methods. The other methods may include using some form of wireless communication, sending a message over the Internet, or even entering the public key or wallet address manually as an alphanumeric string or a hexadecimal string.

Once Alice has provided the public key or wallet address in step 812, the user of the smartphone can authorize a cryptocurrency transaction in step 814. For example, the user may wish to send 0.3 Bitcoin to Alice, and pay a fee of 0.001 Bitcoin for conducting the transaction. The user then sends the transaction to the cold wallet in step 816. Such a step may be moderated by the security module of the CWC.

In step 818, the cold wallet signs the transaction with the private key to which it has access, using the security module to interact with the secure storage in which the keys are protected. In step 820, the cold wallet propagates the transaction throughout the blockchain. Once the transaction may be introduced into the blockchain, it becomes a candidate for step 822, in which the transaction may be a candidate for mining in the next block. In step 824, a successful miner adds the transaction to the blockchain. Once this has been accomplished, in step 826, nodes verify and propagate the block that has been added by the miner. As part of this propagation, in step 828, Alice receives a confirmation that she has received the relevant funds. The confirmation may also include a confirmation that the funds were successfully sent.

Figure 9A:
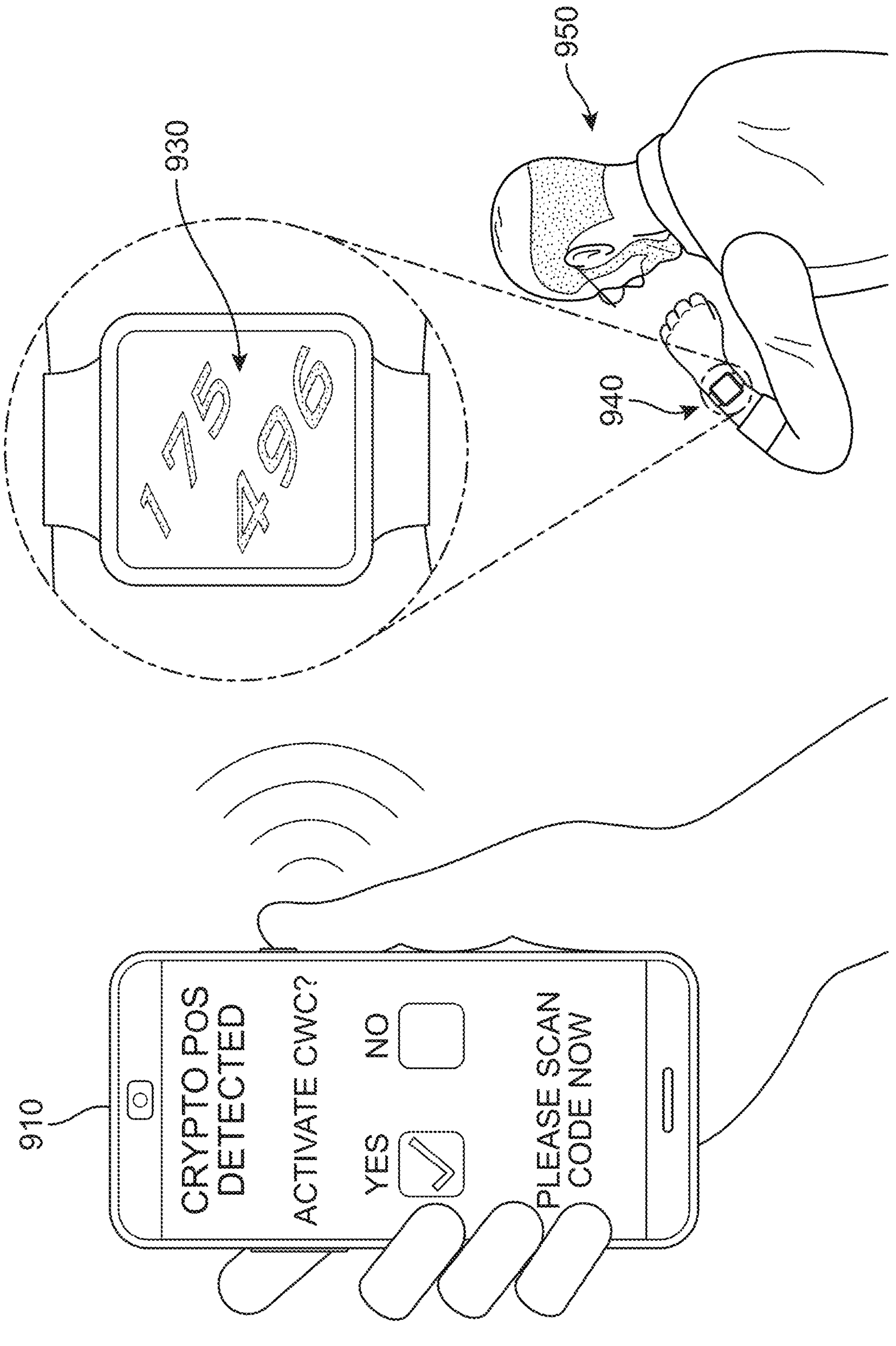
FIGS. 9A-9C show an example of a verification process that can be performed before activating a cold wallet microchip onboard a smartphone.
Figure 9B:
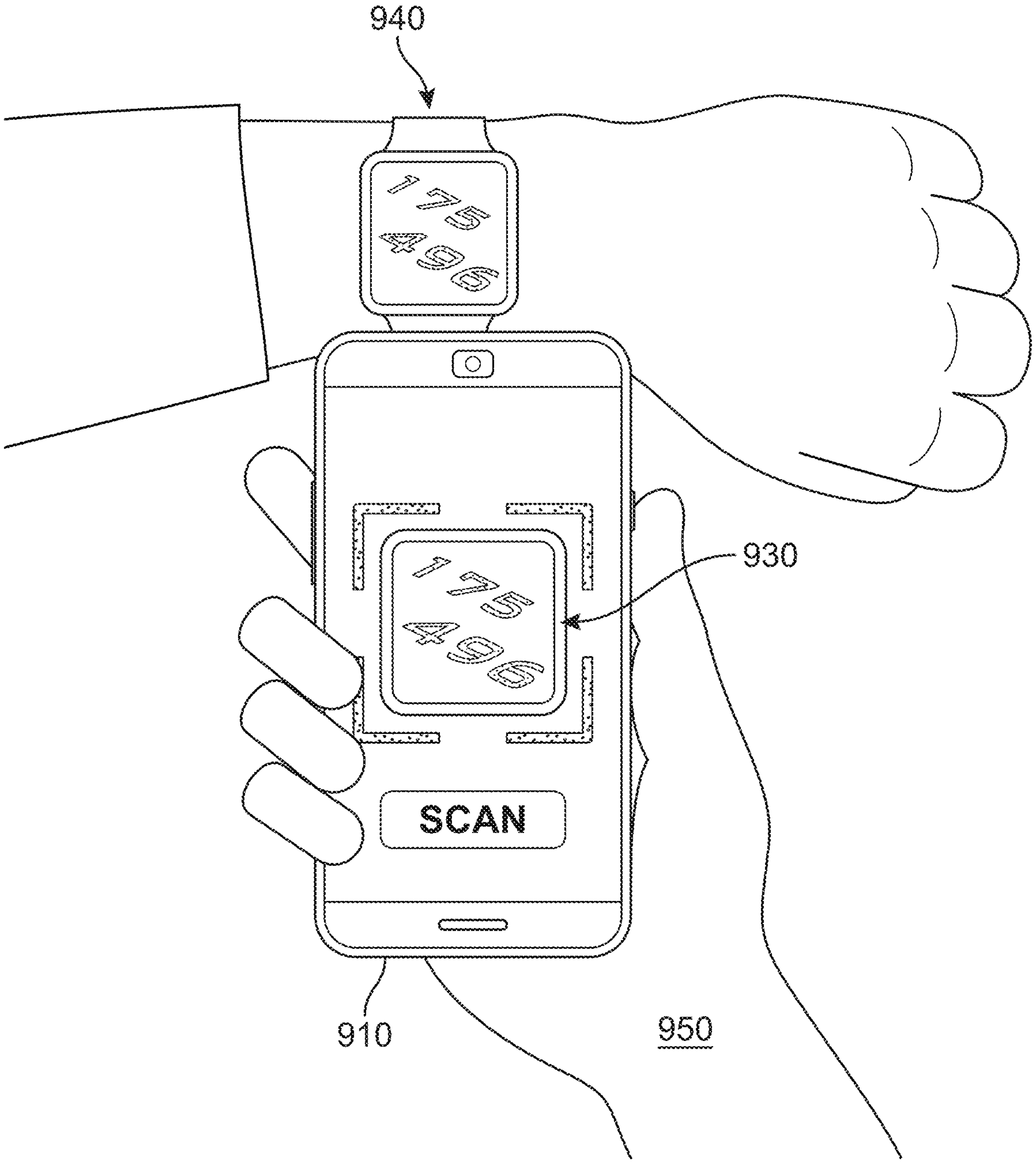
Figure 9C:
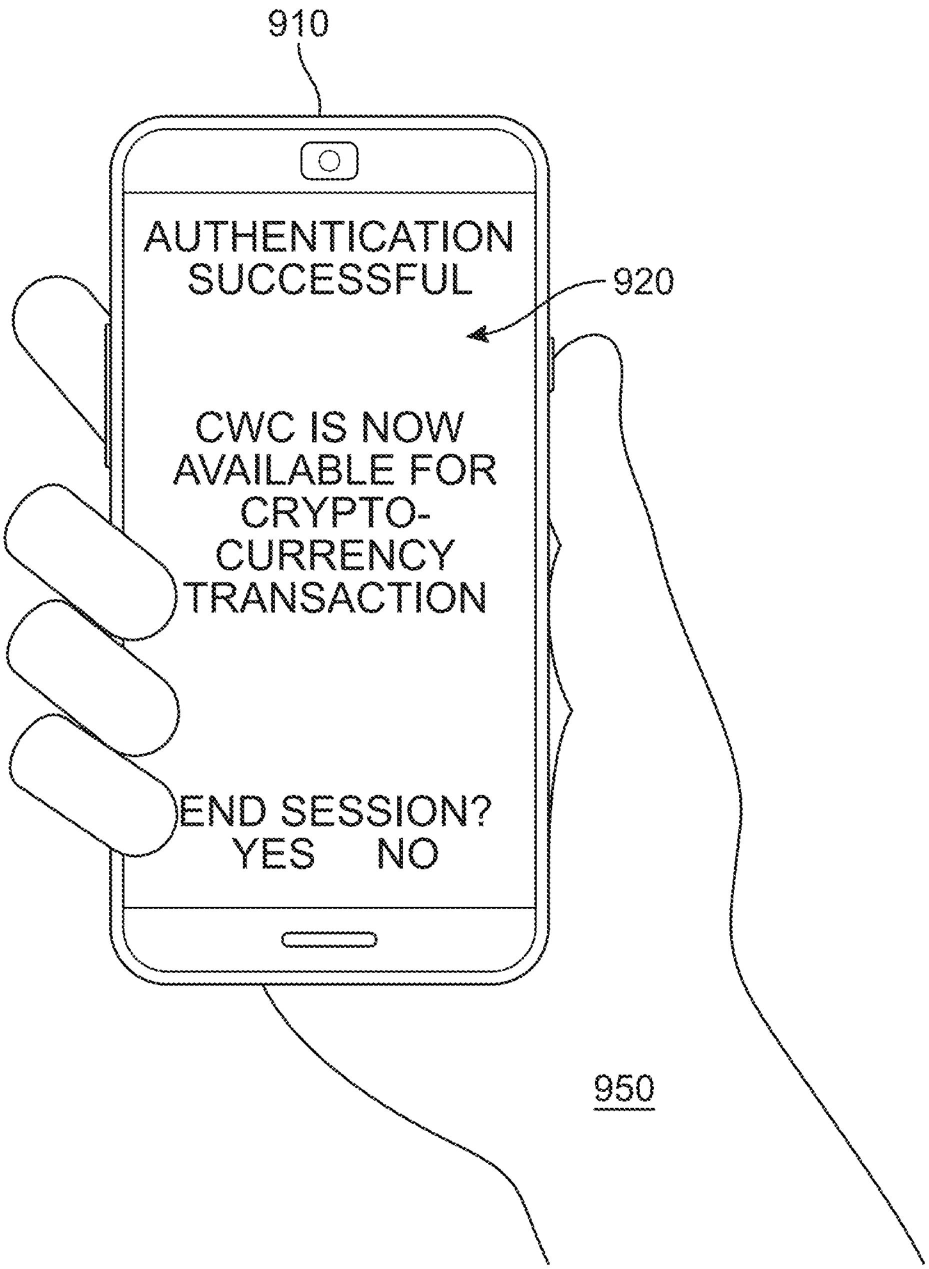

For purposes of illustration, FIGS. 9A-9C show an example of an authentication and activation process for a CWC that has been installed into a smartphone. As noted earlier, in order to permit access during cryptocurrency transactions, the cold wallet of the CWC can require additional verification beyond a biometric authentication that is available through their smartphone. In some embodiments, the system can require additional data from an interacting transaction device (a POS terminal, another smart phone, a tablet or other payment device) where the interacting transaction device communicates with the smartphone and indicates that it is capable of accepting cryptocurrency as a form of payment. In some cases, the CWC system can prevent or grey out the option of using cryptocurrency if this communication is not received from the interacting transaction device. In other words, in some embodiments, a CWC software application ("app") that can be provided that can display messages and/or other information as well as instructions for the user of the integrated CWC. In some embodiments, the app is part of the CWC system that detects when an interacting transaction device accepts cryptocurrency.

In some embodiments, in response to detecting this signal, the app produces a secure code such as a QR code or QR animation on a paired smart watch worn by the user. This is depicted in FIG. 9A, where a smartphone 910 has detected an interacting transaction device, and app 920 has automatically presented a message to a user 950 to guide them to obtaining this additional verification data. For example, app 920 can generate a signal to a nearby paired smartwatch 940 that causes the smartwatch 940 to present a code 930 on its screen. Moving to FIG. 9B, this code 930 can be shown to the smartphone's front camera (e.g., scanned) as an additional verification. In FIG. 9C, in response to the receipt and match of the correct or expected code at the app 920, the system temporarily connects the cold wallet to the phone, as described earlier. In other examples, the user 950 could instead carry an additional smart token, such as a low power wireless tracker (e.g., Chipolo® Card Spot, Tile®, Jiobit® Smart Tag, AirTag®, Samsung Galaxy SmartTag, etc.) can be scanned by the smartphone and used to provide the additional verification. In this embodiment, the ID of the wireless tracker is used as half of a secure key that is combined with the other half of the secure key located on the smart phone to create a complete key that is used to provide the additional verification and trigger the connection/activation of the cold wallet. These verification techniques may be combined in various combinations. In different embodiments, once the cryptocurrency transaction has been completed, the CWC system is configured to immediately disconnect the cold wallet database from the smart phone to prevent unauthorized transactions.

Figure 10:
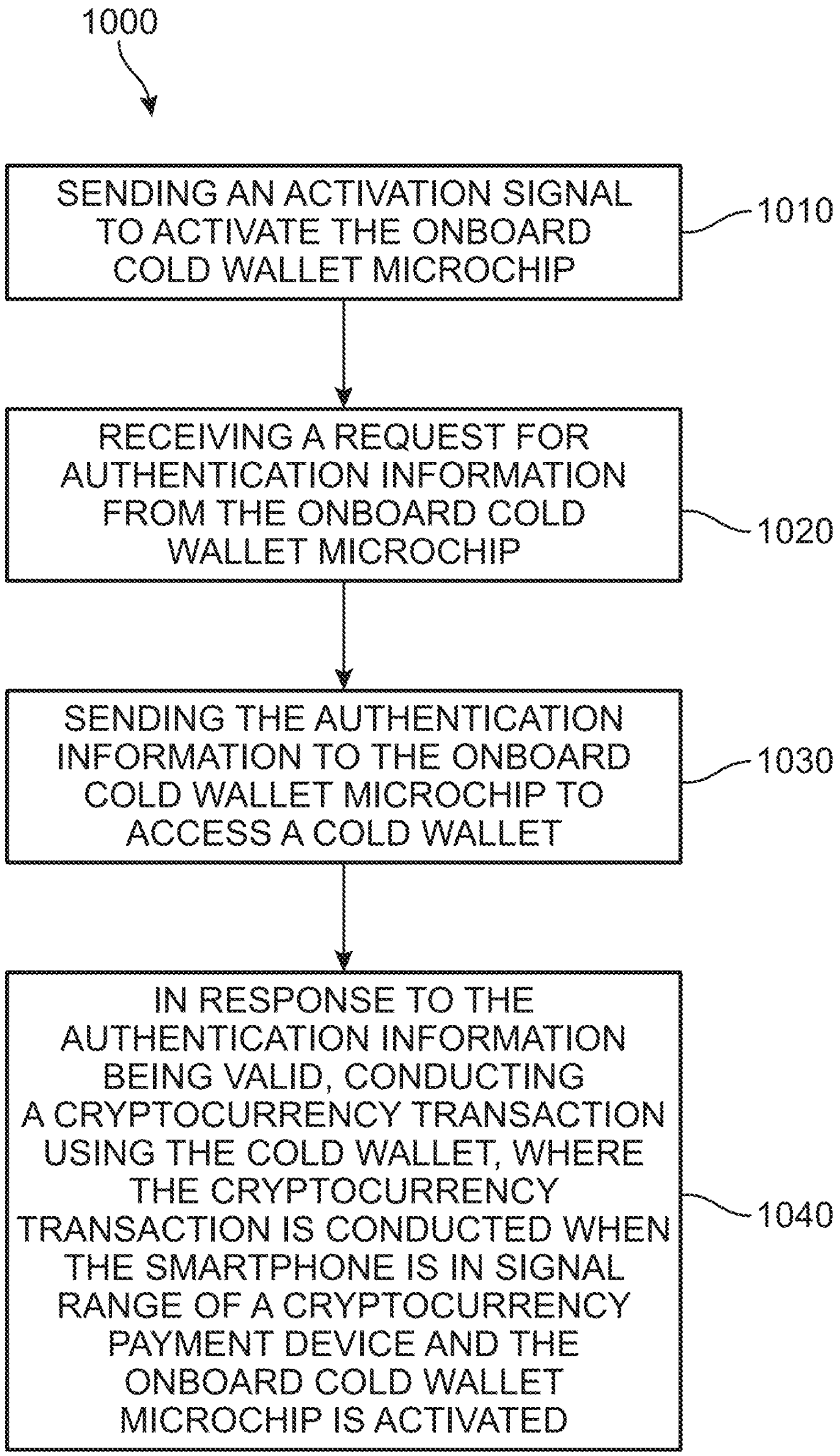
FIG. 10 is a flow chart showing a process by which a smartphone interacts with an onboard cold wallet microchip, according to an embodiment.

FIG. 10 is a flow chart illustrating an embodiment of a method 1000 performed by a smartphone configured to interact with an onboard cold wallet microchip. The method 1000 includes a first step 1010 of sending an activation signal to activate the onboard cold wallet microchip, and a second step 1020 of receiving a request for authentication information from the onboard cold wallet microchip. The method 1000 also includes a third step 1030 of sending the authentication information to the onboard cold wallet microchip to access a cold wallet provided by the cold wallet microchip, and a fourth step 1040 of conducting a cryptocurrency transaction using the cold wallet in response to the authentication information being valid, where the cryptocurrency transaction is conducted when the smartphone is in signal range of a cryptocurrency payment device and the onboard cold wallet microchip is activated.

In other embodiments, the method 1000 may include additional steps or aspects. In one embodiment, the method 1000 also includes sending a signal to the cold wallet microchip to deactivate the cold wallet. In some embodiments, the smartphone sends the activation signal in response to the smartphone detecting the cryptocurrency payment device in signal range or in response to a request by a user of the smartphone. In another example, the cryptocurrency transaction is sending cryptocurrency and the conducting the cryptocurrency transaction includes obtaining transfer parameters from a user of the smartphone, confirming the transfer parameters by communicating with the onboard cold wallet microchip, and using private keys stored in the cold wallet to sign the outgoing transaction prior to sending the transaction to a blockchain. In another example, the cryptocurrency transaction is receiving cryptocurrency and the conducting the cryptocurrency transaction includes obtaining at least one of a public key derived from a private key stored in the cold wallet and a wallet address. In different embodiments, the authentication information is sent using at least one of the wireless power signal, a wireless signal other than the wireless power signal, and a wired connection between the smart phone and the onboard cold wallet microchip.

In other embodiments, a cold wallet microchip configured for insertion in a smartphone is also disclosed. The cold wallet microchip (or "chip") includes a cold storage memory module, the cold storage memory module storing at least one private key associated with a cryptocurrency account, and a security module, configured to: (a) receive an activation signal from the smartphone after the cold wallet microchip has been inserted into the smartphone; (b) power up the cold wallet microchip; (c) send a request to the smartphone for authentication credentials; (d) receive authentication credentials from the smartphone; (e) validate the authentication credentials from the smartphone; (f) in response to the authentication credentials being valid, form a physical connection between the security module and the cold storage memory module; (g) receive a request for a cryptocurrency transaction associated with the cryptocurrency account from the smartphone; and (h) conduct the cryptocurrency transaction requested by the smartphone using the at least one private key.

In other embodiments, the cold wallet microchip may include additional features or aspects. In one example, the security module receives the activation signal when the smartphone has detected a crypto payment device. In another example, in response to the security module determining that no additional cryptocurrency transactions are necessary, the security module is further configured to detach the physical connection with the cold storage memory module and to power down the cold wallet microchip. In some embodiments, the authentication credentials include at least one of hardware authentication credentials identifying the smartphone and software authentication credentials identifying at least one of a user of the smartphone and a cryptocurrency account of the user of the smartphone. In another embodiment, the cold storage memory module includes a memory that stores the private keys that is only accessible when the cold wallet microchip is powered on and the security module is physically connected to the cold storage memory module. In some embodiments, the cold wallet microchip further includes at least one of a wireless communication module and a wired communication module and the cold wallet microchip receives the authentication credentials using at least one of the wireless communication module and the wired communication module.

In different embodiments, the cryptocurrency transaction includes one of performing a balance check, receiving cryptocurrency, and sending cryptocurrency, and wherein parameters for the cryptocurrency transaction are confirmed by a secure interaction between the smartphone and the cold wallet microchip using the security module. In some embodiments, the cold wallet microchip is sized and dimensioned for insertion into a Subscriber Identification Module (SIM) slot provided on the smartphone (i.e., has a form factor that is substantially similar to that of a standard SIM card). In another example, the cold wallet microchip is snugly received by a receptacle formed on a SIM card tray directly before it is inserted into the SIM slot of the smartphone. In some embodiments, the cold wallet microchip is embedded in the smartphone at the time the smartphone was manufactured. In one example, the security module is further configured to, in response to the authentication credentials and the parameters of the cryptocurrency transaction being unconfirmed, deny a cryptocurrency transaction requested by the smartphone. In different embodiments, the validating comprises identifying the smartphone using hardware credentials of the smartphone and comparing the authentication credentials to at least one of user information and account information stored in a storage of the cold wallet microchip.

Some embodiments may include provisions for activating a cold wallet. In some embodiments, such activating may be an initial powering-on that may be followed by a provision of credentials to actually use the cold wallet. In some embodiments, the cold wallet activates the cold wallet when the CWC is placed into the smartphone. In some cases, the cold wallet activates when the smartphone may be in direct physical contact with the CWC. In some embodiments, the cold wallet may activate when the smartphone may not be in direct physical contact with the CWC, but may be instead extremely close (such as within a couple of millimeters), which may indicate that the CWC may be in the process of inserted into the smartphone. However, in such embodiments, when the cold wallet begins to activate when the smartphone is near to the CWC, the cold wallet may deactivate if the smartphone is not subsequently placed into direct physical contact with the CWC or fully installed into the smartphone. In some cases, the smartphone may signal that it detects a CWC in direct physical contact or close proximity by activating the cold wallet using a wireless charging signal.

In some embodiments, a protocol such as Qi charging may be used for sending the wireless charging signal. In some cases, another protocol such as PMA charging may be used for sending the wireless charging signal. In some embodiments, the signal sent may be a particular wake-up signal sent from the smartphone to the CWC, such that the wake-up signal may be received at the CWC. Such a wake-up signal initiates a wake-up and powering on of the CWC hardware. The CWC may be subsequently able to initiate operations of the cold wallet integrated in the CWC. In some cases, the cold wallet that may be a part of the CWC may only be able to be powered on in response to receiving a signal from the smartphone. In some embodiments, it may be possible to turn the cold wallet may be turned on using another approach, such as a button or switch. However, even if another control may be used as part of turning on the cold wallet, a wireless power interaction with the smartphone may be a part of fully activating the cold wallet.

Wireless power transmission using a wireless power module, which may include Qi charging, has a very short range. For example, the Qi standard provides that wireless charging has a range of up to 40 mm (or 4 cm). However, in some embodiments, with wireless charging, the device sending the wireless power and the device receiving the wireless power will either be in direct physical contact with one another, or will only be separated by 1-2 millimeters. If the CWC is placed inside of the smartphone, this distance expectation may be satisfied. In these cases, the wireless power module of the smartphone may either be in direct physical contact with wireless power module or in near-direct physical contact (i.e., 1-3 millimeters of separation) with the corresponding wireless power module of the CWC. Such a level of proximity may be sufficient to provide for successful wireless power interaction between the smartphone and the CWC.

It may also be possible for the wireless power interaction to allow the smartphone to supply the CWC with energy. The wireless power interaction may provide operational energy or charge the battery of the CWC. Such energy may originate as energy from the battery of the smartphone, or an external wired power source connected to the phone, such as through a phone charging plug.

However, in different embodiments, a primary purpose of the interaction between the smartphone and the CWC using wireless power may be to activate a cold wallet in the CWC. In one example, the CWC cannot be activated without receiving a particular data signal embedded in a wireless transmission. Only after the CWC is activated can a user can then establish an identity using credentials provided by the smartphone to the CWC. Specifically, once the CWC is activated, then and only then can its security module authenticate a user using credentials to form a connection with its memory card to use the private keys stored on the memory card as the basis for cryptocurrency transactions and balance requests.

Thus, a smartphone and a CWC may interact in a number of ways. The CWC, as discussed, may include elements that may be activated by smartphone. Specifically, when the smartphone sends the proper signal (e.g., using wireless power transmission) the CWC receives the signal, and the internal elements of the CWC activate. For example, the smartphone and the CWC may send and receive wireless power (such as but not limited to Qi power).

However, the smartphone and the CWC may use other forms of wireless communication to communicate. While Bluetooth may be a suitable protocol, other protocols such as ZigBee, Wi-Fi, cellular (3G, 4G Long-Term Evolution (LTE), 5G New Radio (NR), Near-Field Communication (NFC) and so on may also be used in other examples. Alternatively, once the CWC is activated, the smartphone and the CWC may communicate using a wired connection. Such a wired connection may involve a connection between an element of the microchip of the CWC and an element of the smartphone processor. However, it may also be possible for there to be another physical connection between the smartphone and the CWC through which the smartphone and the CWC can exchange data.

Some embodiments may include provisions for an embedded or removable cold wallet chip that includes an integrated cold wallet. In some cases, the cold wallet activates when inserted into a smartphone. In some embodiments, placing the CWC into the smartphone may be detected due to an interaction involving a wireless or wired signal. In some cases, the CWC interacts with the phone hardware to activate. In some embodiments, the CWC confirms a physical contact with a smartphone. In some cases, the CWC confirms the identity of a smartphone in which it has been inserted. In some cases, such confirmation uses an IMEI or another form of identification that may be uniquely associated with the smartphone and may be difficult to duplicate.

In some embodiments, the CWC confirms the presence of hardware associated with an account of a user. In some cases, the CWC may gather identifying information from a SIM card associated with the smartphone as a way of confirming the identity of the smartphone. In some embodiments, there may be a button or another control that may be integrated into the smartphone or the CWC, and pushing the button or otherwise activating a control may be a part of the accessing of the cold wallet.

In some embodiments, the phone case interacts with software executed by the smartphone to activate the cold wallet. In some cases, the CWC receives an activation request from software executed by the smartphone. In some embodiments, the CWC receives an activation request from an application or a mobile app executed by the smartphone. In some cases, the application or the mobile app sends the activation request when instructed to do so by a user of the smartphone. In some embodiments, the application or the mobile app sends the activation request automatically. In some cases, the application or the mobile app sends the activation request based on a physical action, such as when the CWC is introduced into the smartphone or when the smartphone otherwise detects that the smartphone and the CWC may be in direct physical contact. In some embodiments, the application or the mobile app sends the activation request when instructed to do so by a user of the application or the mobile app.

In some cases, the CWC receives an activation request from an operating system (OS) of the smartphone. In some embodiments, the smartphone may include a program associated with the OS, such as a background process or a driver. Such a background process or driver may periodically check for the presence of a CWC that has been introduced into the smartphone. In some cases, the CWC may trigger an interrupt or otherwise generate a signal when it is inserted into the smartphone. The OS of the smartphone may then interact with the CWC to provide the necessary credentials so that the smartphone may be able to activate the cold wallet and subsequently perform cryptocurrency transactions.

Some embodiments may include provisions for allowing the smartphone to access the cold wallet integrated into the CWC. In some embodiments, the access expects that the cold wallet may be powered on. In some cases, as discussed above, the powering on may involve a wireless power signal sent by the smartphone to activate the cold wallet, or variants of such an approach. In some embodiments, the credentials provided for access to the cold wallet may be provided using a wireless pairing. In some embodiments, the wireless pairing may be a wireless power pairing. In some cases, the wireless power pairing uses a Qi pairing. In some embodiments, the wireless power pairing uses a PMA pairing instead. In some cases, a Bluetooth paring may be used as the type of wireless pairing. In some embodiments, a Wi-Fi pairing may be used as the type of wireless pairing. In some embodiments, a ZigBee pairing may be used as the type of wireless pairing. In some embodiments, a cellular pairing may be used as the type of wireless pairing. In some cases, the cellular pairing uses 3G, 4G LTE, or 5G NR technologies. In some cases, a Near-Field Communication (NFC) pairing may be used as the type of wireless pairing. In some embodiments, the smartphone obtains access to the cold wallet using a wired pairing. In some cases the wired pairing may be a Universal Serial Bus (USB) pairing. In some cases, the pairing uses a combination of wired and wireless pairing. In some cases, the pairing uses multiple types of wired pairing. In some embodiments, the pairing uses multiple types of wireless pairing.

Thus, the embodiments discussed herein provide for a cold wallet. The cold wallet offers many of the advantages that may be typical for a cold wallet. For example, the private key may be unexposed because it may not be stored on a computer or directly accessible by the Internet. Additionally, the cold wallet may be capable of storing multiple cryptocurrencies in the same cold wallet. Because the cold wallet may not be directly accessible by the Internet, it may not be vulnerable to viruses and malware. Furthermore, only transactions that are verified using the stored private keys may be conducted.

However, the particular cold wallet presented herein offers several additional advantages. The cold wallet includes robust security features, including features that use surface to surface proximity. For example, while existing security protocols exchange credentials such as passcodes and biometrics, the cold wallet uses a two-stage process where wireless charging may be used to even turn the cold wallet on. Such a process increases the security of embodiments by ensuring that the cold wallet is only accessible in secure ways.

Further, the integration of the cold wallet into an insertable chip may not only be secure, but may be more convenient. In general, it may be easy to use a cold wallet integrated into a CWC because it will be convenient to insert the CWC into the smartphone. When the CWC is in the phone, the surface-to-surface proximity criterion may be satisfied. It may be unlikely that a phone case will be lost, and the phone case can continue to verify that the surface-to-surface proximity may be maintained as transactions may be completed.

As a general matter, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. Voice control can also be used to actuate options. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, smart watches, smart glasses, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

The invention claimed is:

1. A cold wallet microchip configured for insertion in a smartphone, the microchip comprising:

a cold storage memory module embedded in the microchip, the cold storage memory module storing at least one private key associated with a cryptocurrency account;

a security module embedded in the microchip, configured to:

receive an activation signal from the smartphone after the cold wallet microchip is inserted into a Subscriber Identification Module (SIM) slot of the smartphone;

power up the cold wallet microchip in response to receiving the activation signal from the smartphone;

send a request to the smartphone for authentication credentials;

receive authentication credentials from the smartphone;

validate the authentication credentials from the smartphone;

in response to the authentication credentials being valid, form a physical connection between the security module and the cold storage memory module;

receive a request for a cryptocurrency transaction associated with the cryptocurrency account from the smartphone; and conduct the cryptocurrency transaction requested by the smartphone using the at least one private key-, wherein the cold wallet microchip is deactivated upon receiving, at the power module, a deactivation signal from the smartphone, and wherein deactivation of the cold wallet microchip involves a decoupling of the security module from the cold storage memory module.

2. The cold wallet microchip of claim 1, wherein the security module receives the activation signal when the smartphone has detected a crypto payment device.

3. The cold wallet microchip of claim 1, wherein in response to the security module determining that no additional cryptocurrency transactions are necessary, the security module is further configured to detach the physical connection with the cold storage memory module and to power down the cold wallet microchip.

4. The cold wallet microchip of claim 1, wherein the authentication credentials include at least one of hardware authentication credentials identifying the smartphone and software authentication credentials identifying at least one of a user of the smartphone and a cryptocurrency account of the user of the smartphone.

5. The cold wallet microchip of claim 1, wherein the cold storage memory module includes a memory that stores the private keys that is only accessible when the cold wallet microchip is powered on and the security module is physically connected to the cold storage memory module.

6. The cold wallet microchip of claim 1, wherein the cold wallet microchip further includes at least one of a wireless communication module and a wired communication module and the cold wallet microchip receives the authentication credentials using at least one of the wireless communication module and the wired communication module.

7. The cold wallet microchip of claim 1, wherein the cryptocurrency transaction includes one of performing a balance check, receiving cryptocurrency, and sending cryptocurrency, and wherein parameters for the cryptocurrency transaction are confirmed by a secure interaction between the smartphone and the cold wallet microchip using the security module.

8. The cold wallet microchip of claim 1, wherein the cold wallet microchip is sized and dimensioned for insertion into the Subscriber Identification Module (SIM) slot provided on the smartphone.

9. The cold wallet microchip of claim 8, wherein the cold wallet microchip is snugly received by a receptacle formed on a SIM card tray before insertion into the SIM slot of the smartphone.

10. The cold wallet microchip of claim 1, wherein the cold storage memory module is embedded in the smartphone at the time the smartphone was manufactured.

11. The cold wallet microchip of claim 1, wherein the security module is further configured to, in response to the authentication credentials and the parameters of the cryptocurrency transaction being unconfirmed, deny a cryptocurrency transaction requested by the smartphone.

12. The cold wallet microchip of claim 1, wherein the validating comprises identifying the smartphone using hardware credentials of the smartphone and comparing the authentication credentials to at least one of user information and account information stored in a storage of the cold wallet microchip.

13. The cold wallet microchip of claim 1, wherein the authentication credentials are received using at least one of the wireless power signal, a wireless signal other than the wireless power signal, and a wired connection between the smart phone and the onboard cold wallet microchip.

14. The cold wallet microchip of claim 1, wherein the security module is further configured to receive verification data provided by a smartwatch, and the physical connection between the security module and the cold storage memory module is further in response to receiving the verification data.

15. The cold wallet microchip of claim 1, wherein the security module is further configured to receive verification data provided by a low power wireless tracker, and the physical connection between the security module and the cold storage memory module is further in response to receiving the verification data.

16. The cold wallet microchip of claim 1, wherein the physical connection is formed by an electronically controlled switch.

17. The cold wallet microchip of claim 1, wherein the cold wallet microchip is powered by a battery of the smartphone when the physical connection between the security module and the cold storage memory module is formed.

18. The cold wallet microchip of claim 1, wherein access of cryptocurrency by the smartphone is restricted to certain locations.

* * * * *